United States Patent [19]
Miyazaki

[11] Patent Number: 5,007,516
[45] Date of Patent: Apr. 16, 1991

[54] MOTOR VEHICLE BRAKING APPARATUS USING ACCELERATOR PEDAL

[75] Inventor: Nagao Miyazaki, Osaka-sayama, Japan

[73] Assignee: Japan Electronics Industry, Limited, Osaka, Japan

[21] Appl. No.: 400,614

[22] Filed: Aug. 30, 1989

[30] Foreign Application Priority Data

Oct. 11, 1988 [JP] Japan .................................. 63-133227
Apr. 15, 1989 [JP] Japan .................................... 1-96027

[51] Int. Cl.$^5$ .............................................. B60K 41/28
[52] U.S. Cl. ................................ 192/0.072; 192/1.22; 180/278
[58] Field of Search ................... 192/0.072, 1.21, 1.22, 192/1.52; 180/271, 272, 277, 278

[56] References Cited

U.S. PATENT DOCUMENTS

| 1,569,502 | 1/1926 | Kurtis | 180/278 |
| 2,218,721 | 10/1940 | Ross | 192/0.072 |

FOREIGN PATENT DOCUMENTS 49-16127   2/1974  Japan .
49-61826   6/1974  Japan .
54-155529 12/1979  Japan .
56-64826   5/1981  Japan .
57-48131   3/1982  Japan .
59-72130   5/1984  Japan .
61-47762   3/1986  Japan .

Primary Examiner—Richard Lorence
Attorney, Agent, or Firm—Jordan and Hamburg

[57] ABSTRACT

According to the motor vehicle braking apparatus of the present invention, the engine throttle valve is closed when the driver treads the accelerator pedal to an extent exceeding a predetermined range, and the brakes are applied when the driver further treads the accelerator pedal to an extent equal to or greater than a predetermined limit. The braking force is adjusted according to the accelerator pedal treading. When the accelerator pedal treading is released to an extent equal to or greater than a predetermined limit, the application of the brakes is released. However, the engine throttle valve still remains closed. The normal function as the accelerator pedal is restored only after the accelerator pedal treading has been released to an extent near the level causing the accelerator pedal to be fully released. According to the apparatus of the present invention, when intended to apply the brakes in case of emergency, the driver is not required to change the pedal to be trodden, from the accelerator pedal to the brake pedal. This reduces the distance of vehicle travelling made while such pedal change is carried out. This also prevents an accident due to treading of an improper pedal. Further, there is reduced the likelihood that the driver erroneously applies the brakes, against his own will, in pedal operation.

11 Claims, 19 Drawing Sheets

MOTOR VEHICLE BRAKING APPARATUS USING ACCELERATOR PEDAL

BACKGROUND OF THE INVENTION

The present invention relates to a motor vehicle braking apparatus using accelerator pedal arranged such that the brakes are applied when the accelerator pedal of a motor vehicle is trodden with a treading force/displacement not smaller than a predetermined value.

In a motor vehicle, the brakes are conventionally applied with, the use of the brake pedal and the parking brake independently the accelerator pedal. In case of an emergency, accidents often occur due to erroneous treading of the accelerator pedal instead of the brake pedal or due to the fact that the motor vehicle still travels without braking before the driver changes the pedal to be trodden from the accelerator pedal to the brake pedal and the driver actually treads the brake pedal. To avoid such accidents, there have been proposed a number of inventions relating to a pedal structure arranged such that one pedal serves as both accelerator pedal and brake pedal as disclosed by, for example, Japanese Patent Laid-Open Publications SHO49-16127 and SHO49-61826, Japanese Utility Model Laid-Open Publications SHO56-64826, SHO57-48131 and SHO59-72130. These inventions have been proposed with the object of achieving both accelerator and brake functions by treading the same pedal, not only in case of emergency, but also under normal conditions. These structures are arranged such that the accelerator and brake functions are respectively selected according to different positions at which the driver applies a treading force to the same pedal. However, it is not always easy for the driver to select either function by properly treading the same pedal. Accordingly, these inventions may not duly constitute a solution for avoiding the danger that the driver erroneously treads the pedal when applying the brakes in case of emergency.

Japanese Patent Laid-Open Publication SHO54-155529 discloses an apparatus in which the accelerator pedal treading force and treading speed are detected, and in which, if the pedal is once trodden with a treading force or a treading speed equal to or greater than a predetermined value, the engine throttle valve is thereafter closed in a continuous manner to apply the brakes, causing the motor vehicle to be rapidly stopped. Further, Japanese Utility Model Laid-Open Publication SHO61-47762 of the same applicant, discloses an apparatus in which the engine accelerator is continuously stopped upon detection of an accelerator pedal speed or acceleration speed equal to or greater than a predetermined value, and in which, upon detection of a treading displacement equal to or greater than a predetermined value, the brakes are continuously applied to emergently stop the motor vehicle.

According to these inventions, after the accelerator pedal treading force, displacement, speed, acceleration speed or the like has reached a predetermined value, the state where engine acceleration is stopped, is maintained to apply the brakes even though the factor above-mentioned thereafter becomes below the predetermined value concerned. Such application of the brakes is continued until a specified release operation is carried out, for example, by turning OFF the ignition switch (Japanese Patent Laid-Open Publication SHO54-155529), or by once releasing the accelerator pedal and treading it again (Japanese Utility Model Publication SHO61-47762). According to these inventions, the motor vehicle may be automatically stopped even though, after the driver has carried out an emergency operation when it is required to rapidly stop the motor vehicle, he falls, due to an accident or the like, into the state where he cannot futher operate the motor vehicle. This enables the motor vehicle to be securely stopped in case of emergency. However, this apparatus also involve the likelihood that, when the accelerator pedal is suddenly strongly or deeply trodden with the intention of, for example, rapid acceleration at the time it is not required to stop the motor vehicle, the emergency brakes are applied to provoke an accident.

Japanese Utility Model SHO61-47762 discloses, as an embodiment of the invention, a mechanism incorporating a spring adapted to start compression at a position slightly higher than the accelerator pedal displacement position at which the emergency brakes are applied. By such provision, the driver may become aware of the emergency braking start position. However, it is also difficult that such provision securely prevents the driver from erroneously treading the pedal.

In view of the foregoing, the present invention has the object of providing an emergency braking apparatus for a motor vehicle which overcomes the defects of the above-mentioned conventional inventions.

SUMMARY OF THE INVENTION

The present invention provides a motor vehicle braking apparatus using the accelerator pedal.

In one arrangement of the invention, the accelerator pedal is adapted to serve as a normal accelerator pedal when the driver treads it with a treading force/displacement equal to or smaller than a predetermined value. If the driver further treads the accelerator pedal with a treading force/displacement greater than the predetermined value, the engine throttle valve is closed. If the accelerator pedal is further trodden to an extent exceeding a predetermined limit, the brakes are applied. The braking force is adjusted according to the depth to which the accelerator pedal is trodden. When the accelerator pedal is trodden to an extent exceeding the predetermined limit, the accelerator pedal serves as a brake pedal. When the accelerator pedal treading is released to an extent exceeding a predetermined limit, the application of the brakes is released. However, the engine throttle valve still remains closed. After the accelerator pedal treading force has been released to an extent near the level where the pedal is fully relased, the accelerator pedal serves as a normal accelerator pedal.

As compared with a conventional system in which the function of either accelerator or brake is selected according to the position at which the treading force is applied to the pedal, the system of the present invention is simpler in operation since such function is selected according to the treading force or depth applied to the same position. Accordingly, this reduces the likelihood that the driver erroneously treads the pedal in case of emergency. According to the apparatus of the present invention, the same accelerator pedal may be used for applying the brakes not only in case of emergency, but also under normal conditions.

The apparatus may additionally include reaction force generating means arranged such that the accelerator pedal reaction force is suddenly increased when the accelerator pedal is trodden from the treading force/depth level at which the accelerator pedal serves as a normal accelerator pedal, to the treading force/depth level slightly smaller/shallower than the treading force/depth level at which the engine throttle valve is closed. According to this apparatus, a sudden increase in accelerator pedal reaction force enables the driver to become aware, more securely than the conventional invention (Japanese Utility-Model Laid-Open Publication SHO61-47762), of the fact that the accelerator pedal is currently brought to a state immediately before the state where it loses the function of a normal accelerator pedal. This eliminates the danger that the driver erroneously treads the pedal when he has no intention of applying the brakes.

In a further arrangement, when the accelerator pedal is trodden, strongly or deeply in the pedal operation which does not yet apply the brakes, the subsequent enlargement of the engine throttle valve opening degree is delayed by a predetermined period of time (for example, 0.5 second). Accordingly, when the accelerator pedal is trodden, at a speed equal to or higher than a predetermined speed, to an extent that the brakes are applied, the brakes may be applied without acceleration of the motor vehicle. Accordingly, the invention further facilitates the application of the brakes with the use of one accelerator pedal, not only in case of emergency but also under normal conditions.

In still another arrangement when the accelerator pedal is further trodden strongly or deeply to an extent exceeding a predetermined limit where the accelerator pedal serves as a brake pedal, the maximized brakes are applied and such application is continued until a predetermined release operation is carried out. More specifically, the motor vehicle may be rapidly stopped by treading the accelerator pedal strongly or deeply. According to the apparatus, there is provided a treading range where the braking force varies with the accelerator pedal treading force or depth and where the accelerator pedal serves as a normal brake pedal, before the maximized brakes are applied. This reduces the danger that the driver erroneously treads the pedal to brake the motor vehicle to an unnecessary emergency stop.

In still another embodiment when the accelerator pedal is trodden continuously for a predetermined period of time to an extent of a predetermined limit that the accelerator pedal serves as a brake pedal, the maximized brakes are applied and such application is maintained until a predetermined release operation is carried out.

This apparatus achieves operational effects similar to those of the previously described apparatus. Further, when, after the driver has erroneously trodden, against his own will, the accelerator pedal so strongly or deeply that the maximized brakes are applied, the accelerator pedal treading force is weakened in a short period of time, the application of the maximized brakes is not continued. This further reduces the danger of an unnecessary emergency stop due to erroneous pedal treading.

In a further embodiment a shock sensor is provided for detecting a shock, if any, exerted to the motor vehicle. If a considerable shock is exerted to the motor vehicle while the accelerator pedal is trodden strongly or deeply to an extent exceeding a predetermined limit that the accelerator pedal serves as a brake pedal, the maximized brakes are applied and such application is maintained until a predetermined release operation is carried out.

There are instances where, even though the driver becomes aware of a danger during travelling and treads, with intent to stop the vehicle in a emergency, the accelerator pedal so strongly or deeply as to apply the maximized brakes, the motor vehicle accidently collides with a forward obstacle or the like, disabling the driver from further operating the vehicle. In such a case, the apparatus may detect the shock exerted at the time of collision so that the application of the maximized brakes is maintained to automatically stop the motor vehicle. Further, when the driver erroneously treads, against his own will, the accelerator pedal so strongly or deeply as to apply the maximized brakes and, at that time, no shock is exerted to the motor vehicle due to collision or the like, the accelerator pedal treading force may be weakened so that the application of the maximized brakes is not maintained. This reduces the likelihood that an erroneous pedal treading results in unnecessary emergent stop.

In another arrangement an alarm device is provided that is adapted to give a light or sound alarm when the accelerator pedal is trodden so strongly or deeply as to apply the maximized brakes. If the maximized brakes are applied, the fact that the motor vehicle is under emergency stop may be automatically informed both inside and outside of the vehicle.

According to another embodiment the brakes are applied in a manner to provide anti-lock control. This enables the brakes to be applied with the steering ability assured at all times. Thus, the safety may be particularly improved when the maximized brakes are applied to stop the vehicle in an emergency.

In another embodiment, when the accelerator pedal is trodden to an extent exceeding a predetermined range, the clutch is disconnected at the same time when the engine throttle valve is closed. Accordingly, when the driver erroneously treads, against his own will, the accelerator pedal so strongly that the accelerator pedal loses its normal accelerator function, there is no possibility of sudden reduction in speed due to the fact that the engine throttle valve is closed. This enhances the safety. The clutch is adapted to be connected again when the accelerator pedal is so restored as to serve as a normal accelerator pedal.

According to the motor vehicle braking apparatus of the present invention, the driver is not required to change the pedal to be trodden, from the accelerator pedal to the brake pedal, when applying the brakes to the motor vehicle in case of emergency. This not only reduces the distance of vehicle travelling made while such pedal change is carried out, but also prevents an accident due to erroneous pedal treading. Further, when intended to reduce the vehicle speed during normal travelling, the driver may apply the brakes with the use of the same accelerator pedal. This is particularly convenient when frequent braking and acceleration are repeatedly required. Further, the apparatus of the present invention may reduce the likelihood that the driver erroneously applies the brakes even though he intends to accelerate.

DETAILED DESCRIPTION OF PREFERRED EMBODIMENTS

Figure 1:
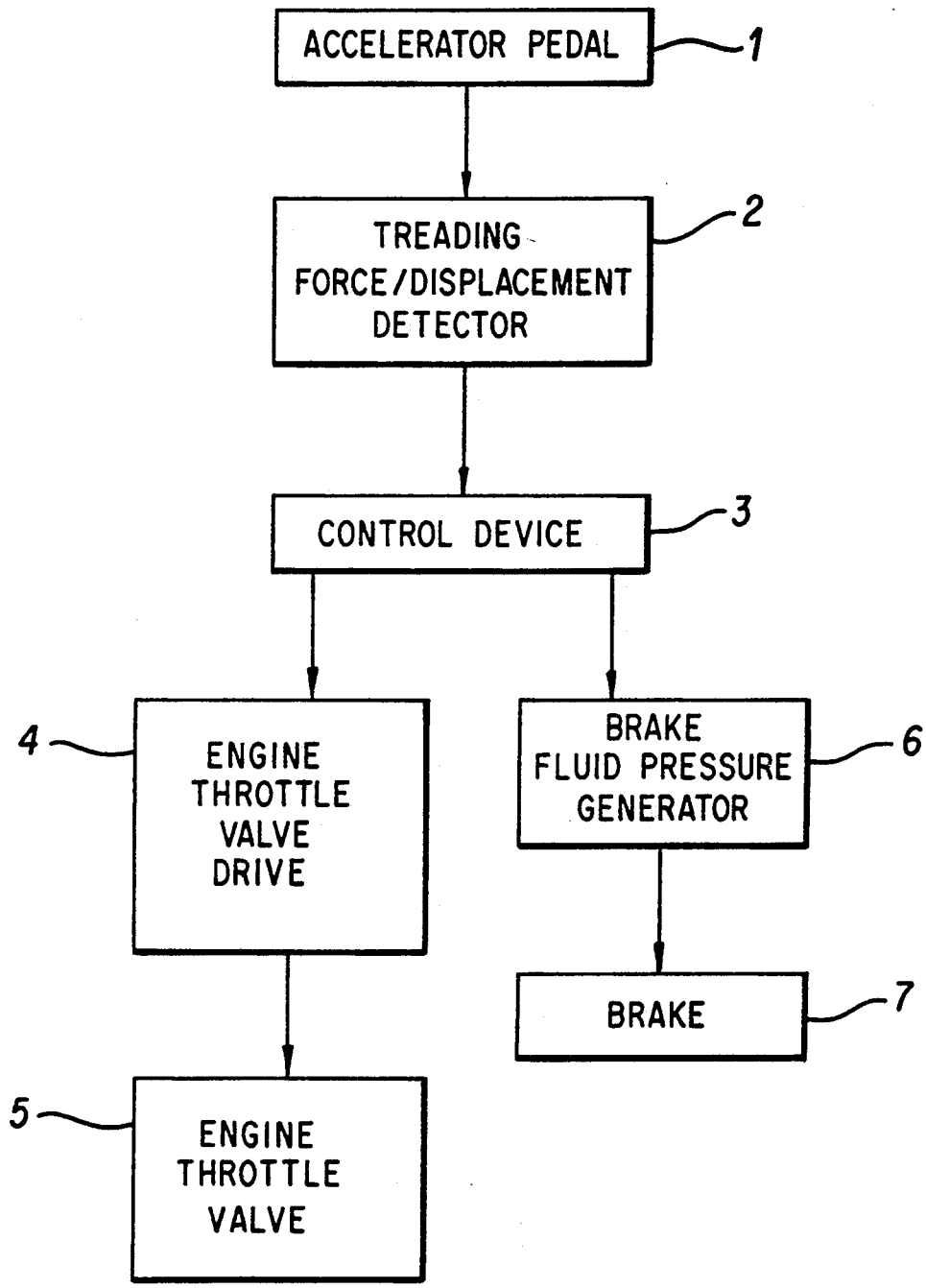
FIG. 1 is a block diagram of an embodiment of apparatus.

FIG. 1 shows a block diagram of an embodiment of apparatus. In FIG. 1, component elements designated by 1, 2, 4, 5, 6 and 7 may be readily arranged according to prior arts, or they are known per se.

A control device 3 is composed of an electronic circuit including a micro-processor, a memory and an input/output interface, and is adapted to be operated according to a program previously written in the memory. A treading force/displacement detector 2 is operatively connected to an accelerator pedal 1 for detecting a treading force/displacement. The treading force/displacement detector 2 may be readily formed by a load sensor, a potentiometer and the like known per se. The control device 3 is adapted to read a detection signal (for example, a signal converted into a voltage) supplied from the treading force/displacement detector 2. Based on the signal thus read, the control device 3 supplies an electric signal (for example, a voltage signal) for instructing the operations of an engine throttle valve drive 4 and a brake fluid pressure generator 6. Based on the signal thus supplied from the control device 3, the engine throttle valve drive deivce 4 and the brake fluid pressure generator 6 respectively drive an engine throttle valve 5 and brakes 7. The throttle valve drive device 4 comprises an actuator for converting an electric signal (for example, a voltage signal) supplied from the control device 3 into a mechanical operation for driving the throttle valve. The throttle valve drive device 4 may be readily arranged according to prior arts. The brake fluid pressure generator 6 is adapted to convert an electric signal (for example, a voltage signal) supplied from the control device 3, into a brake fluid pressure for driving the brakes. The brake fluid pressure generator 6 is also a kind of actuator known per se.

Figure 2:
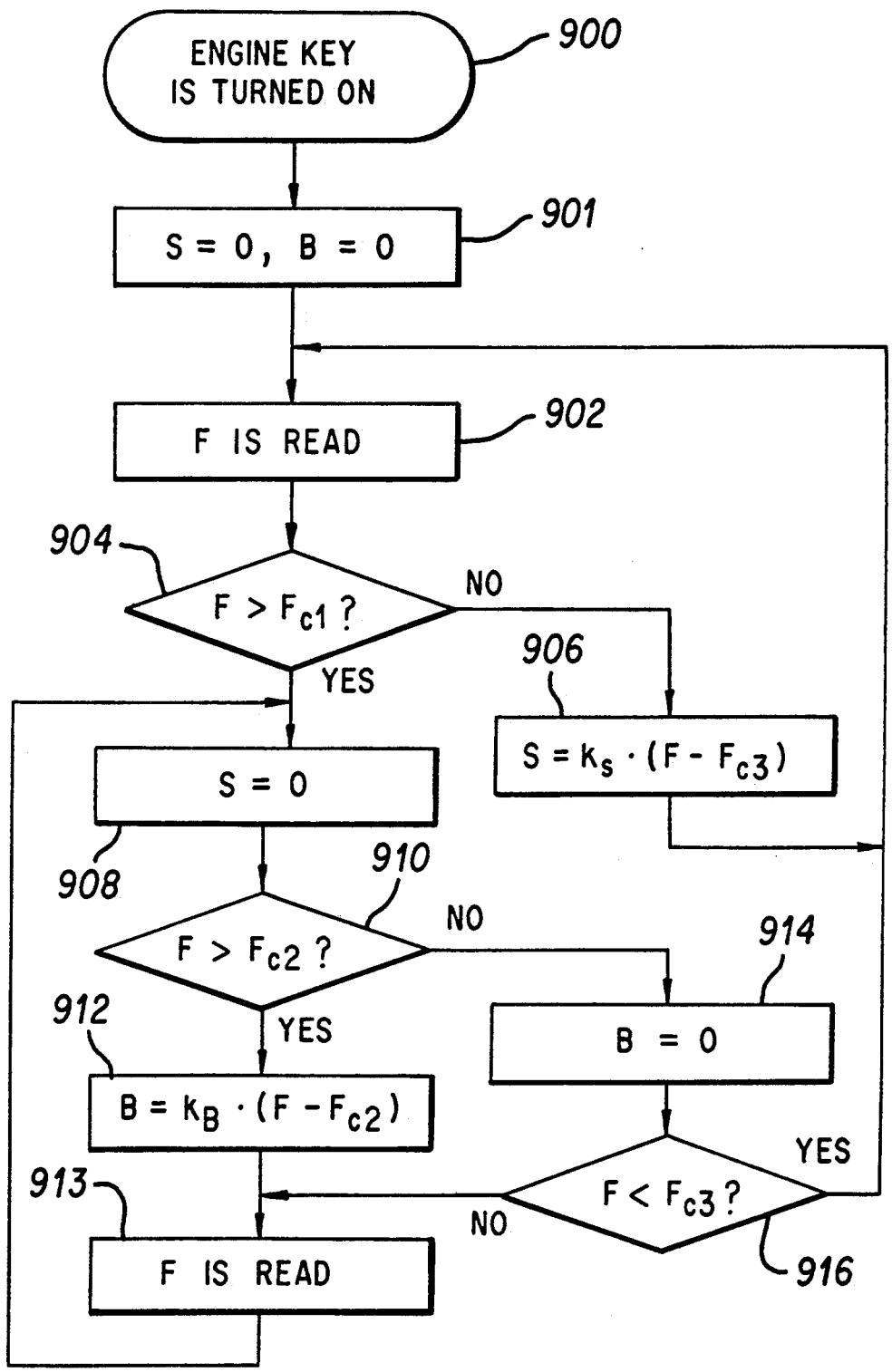
FIG. 2 is a flowchart illustrating the operations of a control device in the embodiment of apparatus in FIG. 1.

FIG. 2 is a flowchart illustrating the operations of the control device 3. When the engine key is turned ON (900), an engine throttle valve opening degree indicating value S and a brake fluid pressure indicating value B are initialized to zero at a step 901. Then, an accelerator pedal treading force/displacement F detected by the device 2 is read (902). At a step 904, the detected value F is compared in size with a predetermined set value $F_{c1}$ (greater than zero). If the detected value F is equal to or smaller than $F_{c1}$, the sequence proceeds to a step 906. The engine throttle valve opening degree indicating value S (for example, a voltage output) to be transmitted to the throttle valve drive device 4, is set to $S = k_s(F - F_{c3})$. The throttle valve drive device 4 is operated to open the throttle valve according to the opening degree proportional to this indicating value S within a range that the throttle valve is not fully opened. When the indicating value S is increased such that the throttle valve is fully opened, the throttle valve remains fully opened even though the indicating value S is further increased. In the equation above-mentioned, $k_s$ is a positive proportional coefficient, and $F_{c3}$ is smaller than $F_{c1}$ and is a positive constant near zero. The sequence is then returned to the step 902. At the step 904, when the detected value F is greater than $F_{c1}$, the sequence proceeds to a step 908, where S is set to zero. This indicates that the engine throttle valve is to be closed.

At a step 910, the detected value F is compared in size with a preset value $F_{c2}$ which is a constant greater than $F_{c1}$. When F is greater than $F_{c2}$, the sequence proceeds to a step 912. The indicating value B for indicating the value of a liquie pressure to the brake fluid pressure generator 6, is set to $B = k_B(F - F_{c2})$ (in which $k_B$ is a positive proportional coefficient). The brake fluid pressure generator 6 generates a brake fluid pressure in proportion to this indicating value B. At a step 913, the detected value F is read. The sequence is then returned to the step 908. At a step 910, when F is equal to or smaller than than $F_{c2}$, the sequence proceeds to a step 914, where B is set to zero. This indicates that the brake fluid pressure is to be released. At a step 916, F is compared in size with $F_{c3}$. When F is equal to or greater than $F_{c3}$, the sequence proceeds to a step 913. When F is smaller than $F_{c3}$, the sequence is returned to the step 902. Preferably, the constant $k_s$ is set such that the throttle valve is fully opened when, with respect to the constant $F_{c1}$, the throttle valve opening degree indicating value S is greater than $k_s(F_{c1} - F_{c3})$ or greater than a value slightly smaller than $k_s(F_{c1} - F_{c3})$. This is also applied to embodiments of the present invention discussed in the following.

Figure 3:
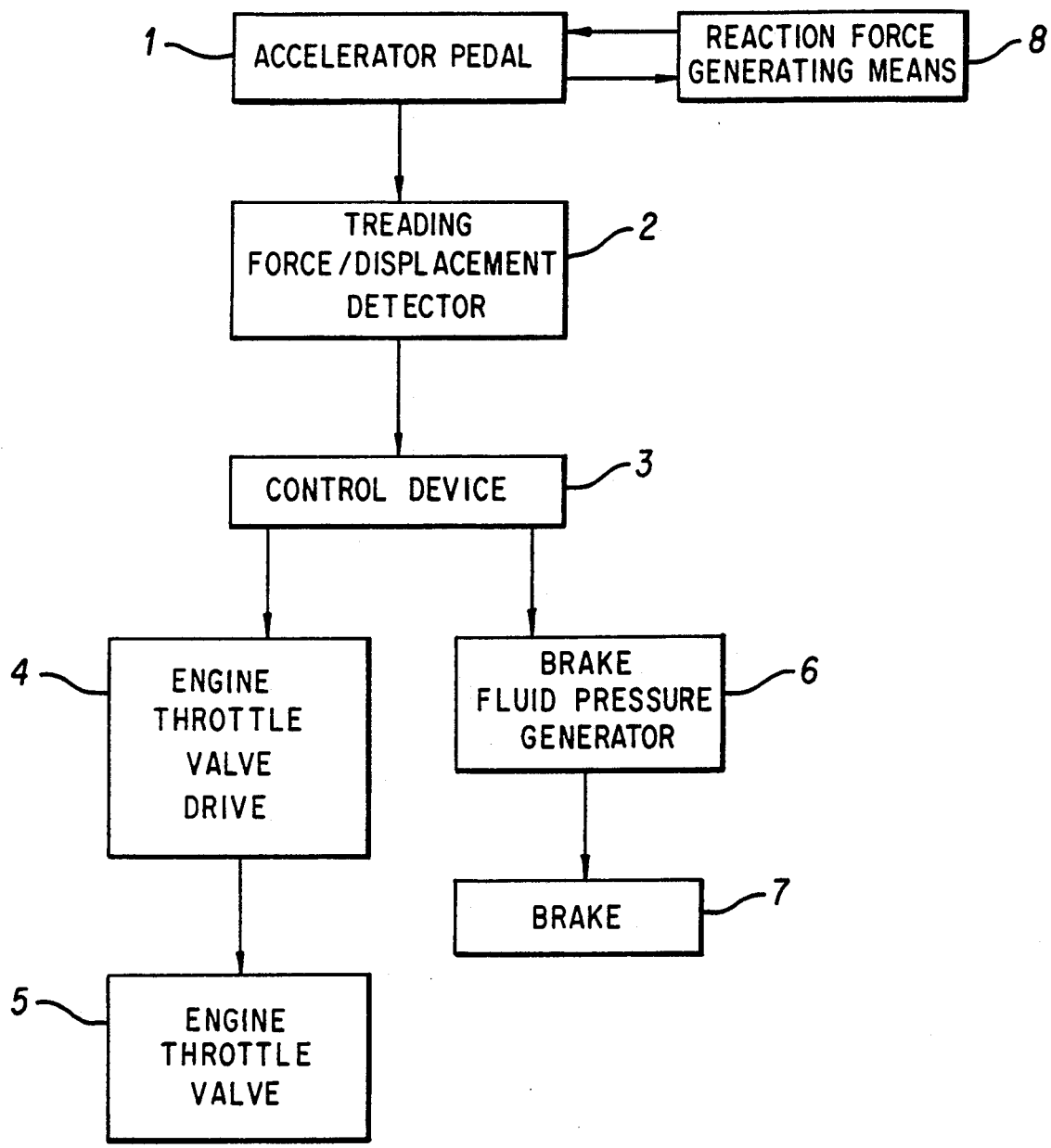
FIG. 3 is a block diagram of another embodiment of apparatus.

FIG. 3 shows a block diagram of another embodiment of the apparatus.

Figure 4:
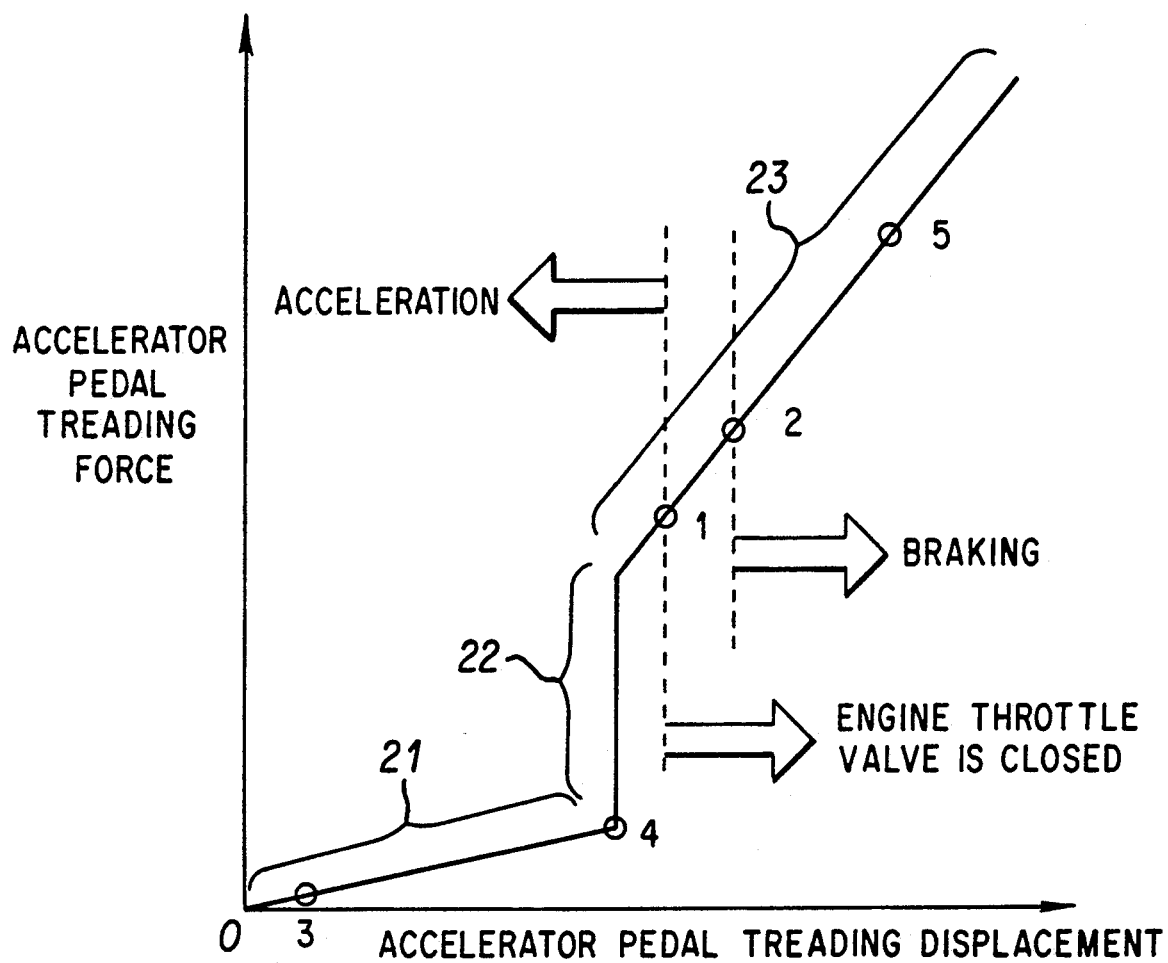
FIG. 4 illustrates the relationship between accelerator pedal treading force and accelerator pedal treading displacement.

This embodiment is characterized in that reaction force generating means 8 is added to the embodiment shown in FIG. 1. By the reaction force generating means 8, there is established the relationship between the accelerator pedal treading force and the accelerator pedal treading displacement, as shown in FIG. 4. The treading force is suddenly increased (decreased) as compared with respect to increase (decrease) in treading displacement, at the level of treading force or treading displacement slightly smaller than the treading force or treading displacement which causes the engine throttle valve to be closed. In the middle course of accelerator pedal treading, the driver may feel such sudden increase, causing him to become aware of the fact that the throttle valve is now about to be closed.

Figure 5:
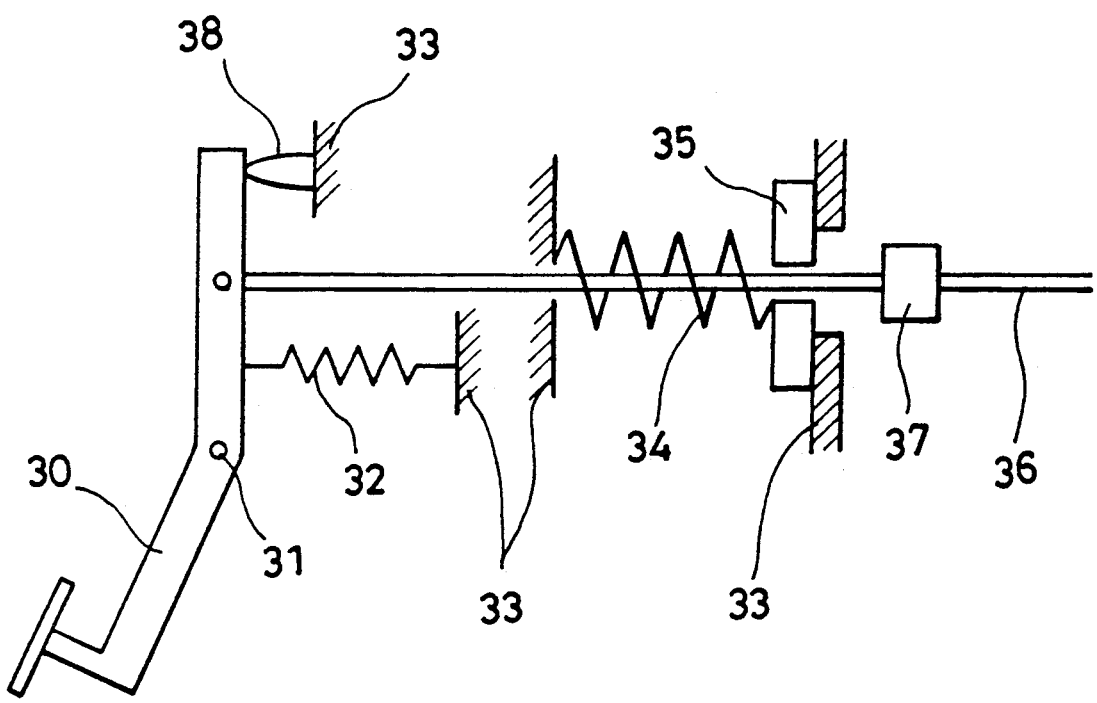
FIG. 5 is a side view of an example of accelerator pedal reaction force generating means in the apparatus 5.

FIG. 5 shows an example of an accelerator pedal incorporating this reaction force generating means.

In FIG. 5, an accelerator pedal 30 has a fulcrum 31 at which the arm of the accelerator pedal 30 is rotatably secured to the vehicle body. There is disposed a return spring 32 for the arm of the accelerator pedal 30. Supports 33 are fixedly connected to the vehicle body. A spring 34 has repelling power stronger than that of the return spring 32. The spring 34 is disposed as compressed. A flange 35 is disposed for compressing the spring 34. A rod 36 is disposed for transmitting the displacement of the accelerator pedal 30 to the treading displacement detector. A flange 37 is fixedly connected to the rod 36 for pushing the flange 35. A support member 38 is disposed for determining the position in which the accelerator pedal 30 is located when released. When the accelerator pedal 30 is trodden, the rod 36 is displaced. While this displacement is small, the pedal reaction force is generated by the spring 32 having weaker repelling power. As the treading displacement is increased, the reaction force is gradually increased. This corresponds to an area 21 of the curve in FIG. 4. When the pedal is further trodden, the flange 37 fixedly attached to the rod 36 comes in contact with the flange 35 which maintains the spring 34, as compressed, of which repelling power is stronger than that of the spring 32. This causes the compression force of the spring 34 to be transmitted to the flange 37. Accordingly, the accelerator pedal reaction force is suddenly increased, in a discontinuous manner, with respect to the displacement. This is represented by an area 22 of the curve in FIG. 4.

When the accelerator pedal 30 is further trodden, the accelerator pedal reaction force is increased according to the increase in the restoring forces of the springs 32, 34. This is represented by an area 23 of the curve in FIG. 4.

Shown in FIG. 4 are positions ① to ④ on the curve corresponding to first to fourth predetermined treading force/displacement values set forth in Claims. Further shown in FIG. 4 is a position ⑤ corresponding to a fifth predetermined treading force/displacement value, to be discussed later.

The operation of a control device 3 in this embodiment is shown in the form of a flowchart in FIG. 2.

According to this embodiment having the accelerator pedal reaction force generating means, it is desired to set the constant $k_s$ such that the throttle valve is fully opened when, with respect to a treading force/displacement value $F_{c4}$ provoking a sudden increase in accelerator pedal reaction force, the throttle valve opening degree indicating value S is greater than $k_s(F_{c4} - F_{c3})$ or greater than a value slightly smaller than $k_s(F_{c4} - F_{c3})$. This is also applied to all embodiments of the present invention shown in the following, as far as the accelerator pedal reaction force generating means is incorporated.

Figure 6:
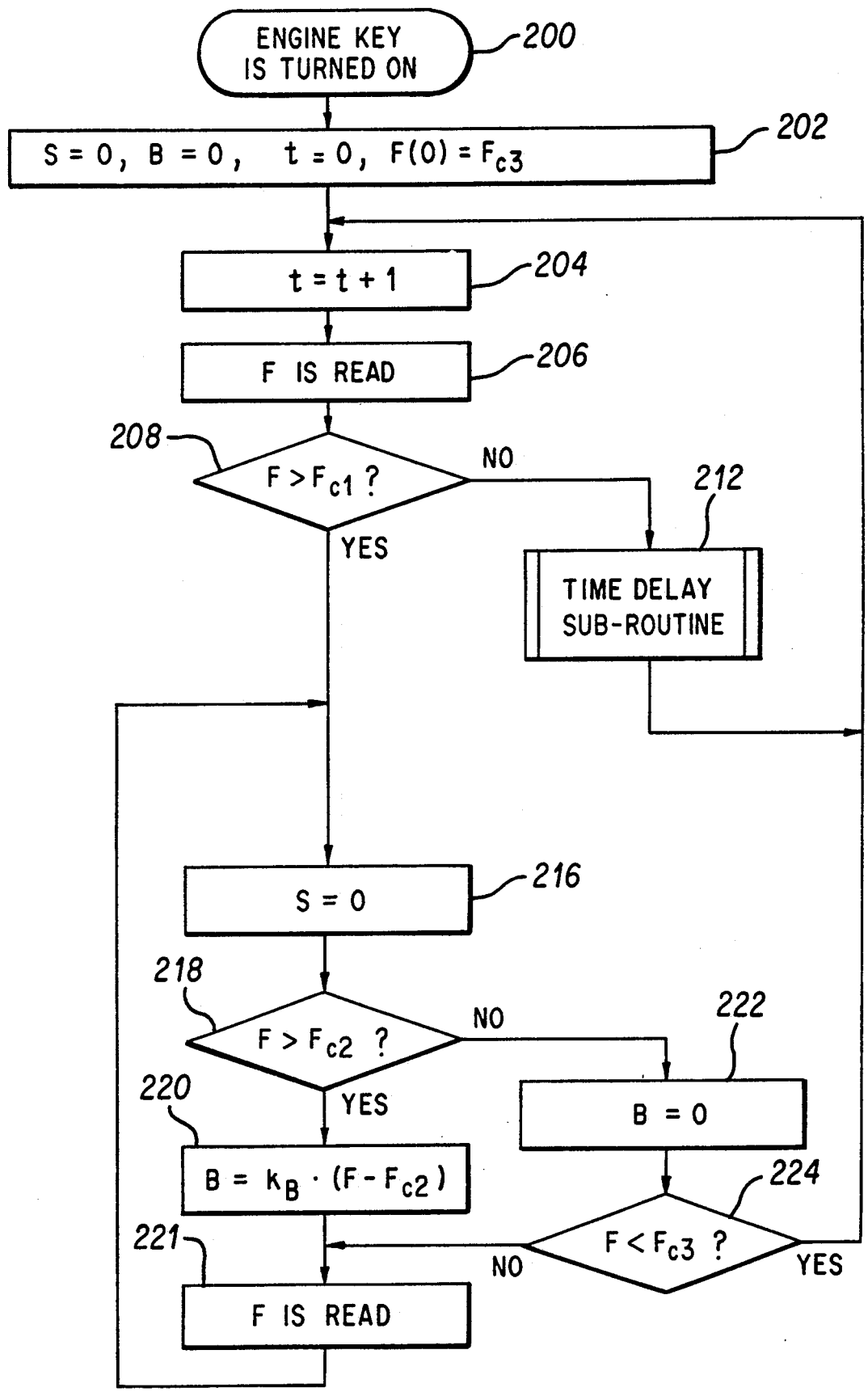
FIG. 6 is a flowchart illustrating the operations of a control device in an embodiment of apparatus.
Figure 7:
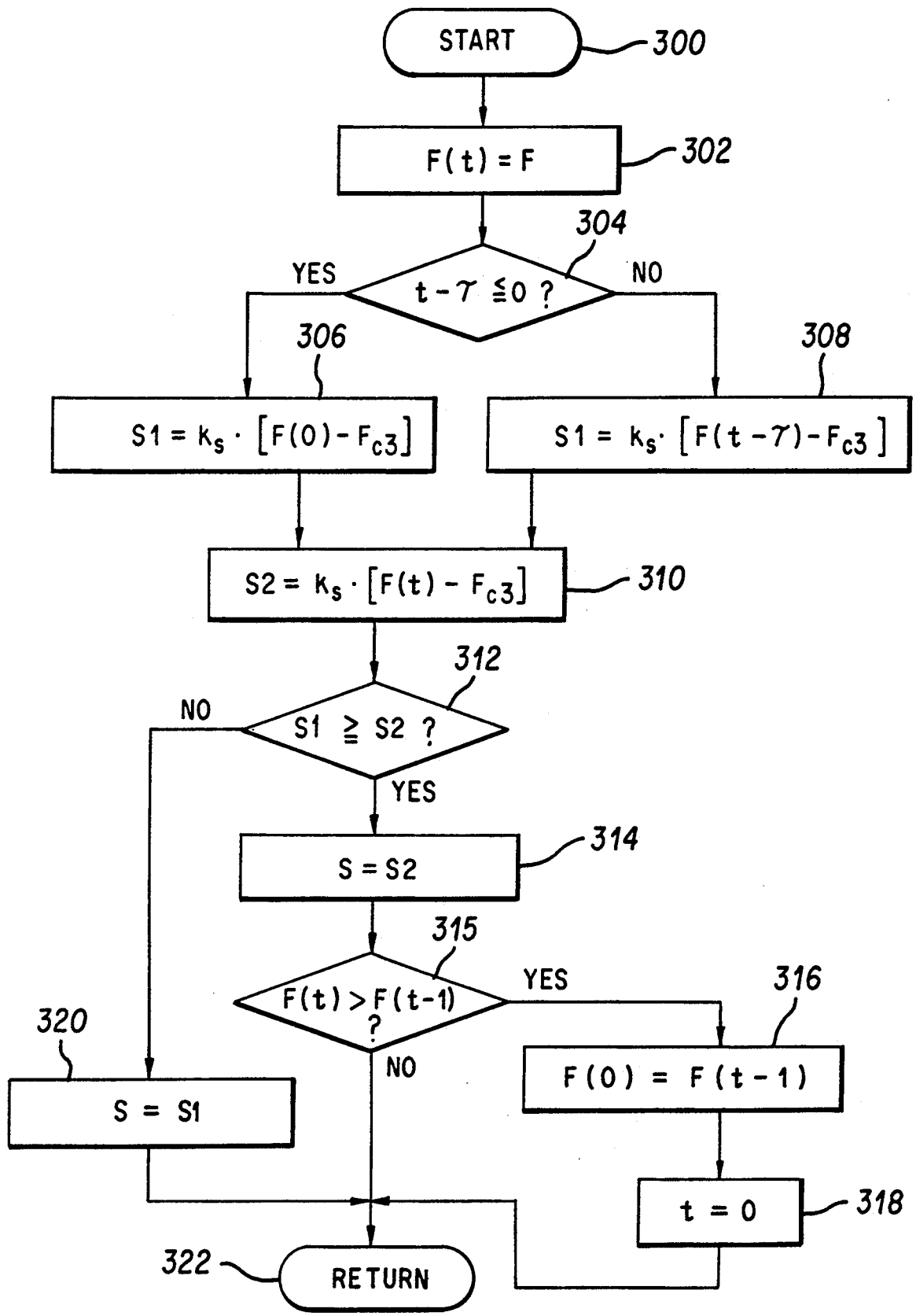
FIG. 7 is a flowchart of a time delay sub-routine used in the flowchart shown in FIG. 6.

Another embodiment of apparatus is shown in the form of a block diagram in FIG. 1 or 3. FIGS. 6 and 7 show, in the form of a flowchart, the operations of a control device 3. In this embodiment, added to the apparatus is a function of delaying, by a predetermined period of time, the opening of the engine throttle valve in response to the accelerator pedal treading.

As shown in FIG. 6, when the engine key is turned ON (200), the variables are initialized at a step 202. That is, an engine throttle valve opening degree indicating value S, a brake fluid pressure indicating value B, and a variable t corresponding to the number of iteration times are set to zero, and a variable F(0) is set to $F_{c3}$. At a step 204, the variable t is renewed to (t+1). At a step 206, a treading force/displacement detected value F is read. At a step 208, the detected value F is compared with the preset value $F_{c1}$. When the detected value F is greater than $F_{c1}$, the sequence proceeds to a step 216. At the step 216, the engine throttle valve opening degree indicating value S is renewed to zero, thereby to instruct that the throttle valve is to be closed. The subsequent steps on and after the step 216, are the same as those on and after the step 908 in FIG. 2. At the step 208, when the detected value F is equal to or smaller than the preset value $F_{c1}$, the sequence proceeds to a time delay sub-routine 212. FIG. 7 shows, in the form of a flowchart, this time delay sub-routine.

When this sub-routine starts at a step 300, a variable F(t) is set to the detected value F at a step 302. At a step 304, for a predetermined positive constant $\tau$, $(t-\tau)$ is compared with zero. Here, $\tau$ corresponds to a delay time added to the response time during which the control device 3 instructs the opening of the engine throttle valve in response to the accelerator pedal treading. Where the processing time during which the sequence is made a round in a loop of the steps 204→206→208→212→204; is expressed by $T_c$, the constant $\tau$ is given by $\tau = T/T_c$ where T is the delay time. At a step 304, when $(t-\tau)$ is equal to and smaller than zero, the sequence proceeds to a step 306. At the step 306, the value of $k_s(F(0) - F_{c3})$ is given to a variable $S_1$, which is then stored. When the difference of $(t-\tau)$ is positive, the sequence proceeds to a step 308. At the step 308, the value $k_s(F(t-\tau) - F_{c3})$ is given to the variable $S_1$, which is then stored. The sequence proceeds to a step 310, where the value $k_s(F(t) - F_{c3})$ is given to a variable $S_2$, which is then stored. At a step 312, the value $S_1$ is compared with the value $S_2$. When $S_1$ is equal to or greater than $S_2$, the engine throttle valve opening degree indicating value S is set to the value of the variable $S_2$. The sequence proceeds to a step 315, where the variable F(t) is compared in size with F(t−1). If F(t) is greater than F(t−1), the sequence proceeds to a step 316, where the variable F(0) is renewed to the value F(t−1). Then, the variable t is renewed to zero, and the sequence proceeds to a step 322, where this subroutine is finished.

At the step 315, if F(t) is equal to or smaller than F(t−1), the sequence proceeds to the step 322, where this sub-routine is finished. At the step 312, when $S_1$ is smaller than $S_2$, the engine throttle valve opening degree indicating value S is set to the value of the variable $S_1$ at a step 320. Then, the sequence proceeds to the step 322, where this sub-routine is finished. When the sub-routine is finished at the step 322, the sequence is returned to the step 204, as shown in FIG. 6.

According to this sub-routine, the engine throttle valve opening degree indicating value S(t) at the time t, is given by the equation $S(t) = $ [a minimum value of $S_0(t-t')$ in a range from $t'=0$ to $t'=T$], where $S_0(t)$ is the engine throttle valve opening degree indicating value at the time when there is given no time delay to the response of the engine throttle valve to the treading force/displacement. The constant T is the response delay time above-mentioned.

Another embodiment of apparatus is shown in the form of a block diagram in FIG. 1, 3, 10 or 14. The operations of a control device 3 in this embodiment are shown in the form of a flowchart in FIG. 8.

The flow from a step 400 to a step 412 or 416 is the same as that from the step 900 to the step 912 or 916 in FIG. 2. At a step 418 subsequent to the step 412, a detected value F is compared with a predetermined set value $F_{c5}$ which is a constant set to a predetermine value greater than the preset value $F_{c2}$. When the detected value F is equal to or smaller than $F_{c5}$, the sequence proceeds to a step 417, where the detected value F is read. Then, the sequence is returned to a step 408. On the contrary, at the step 418, when F is greater than $F_{c5}$, the sequence proceeds to a step 420, where a brake fluid pressure indicating value B is set to a maximum value $B_{max}$. Accordingly, the brake fluid pressure generator 6 provides a maximized brake fluid pressure. Then, the sequence proceeds to a maximized-brake release routine 422. At a step 416, the detected value F is compared in size with the preset value $F_{c3}$. When F is smaller than $F_{c3}$, the sequence is returned to a step 402, and when F is equal to or greater than $F_{c3}$, the sequence proceeds to a step 417.

Figure 9:
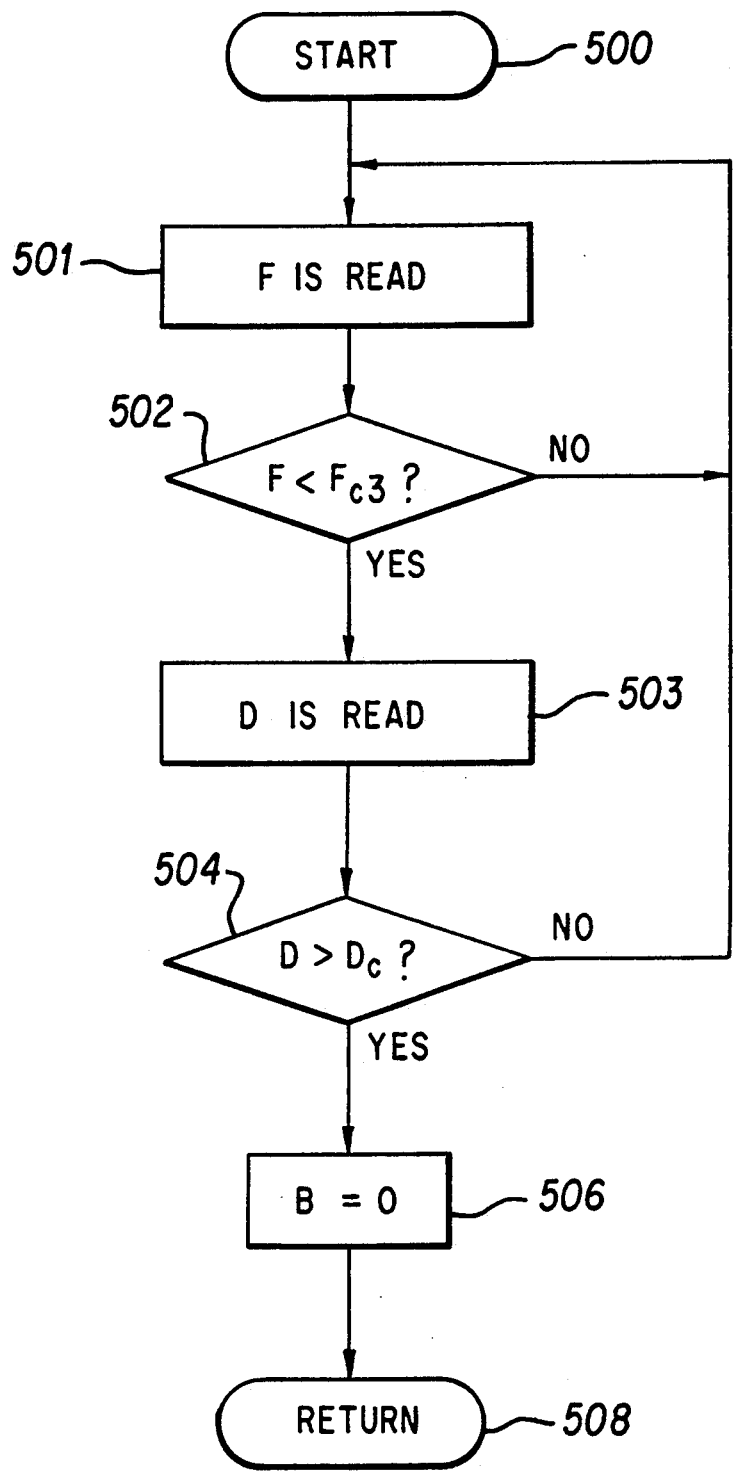
FIG. 9 is a flowchart of an example of a maximized-brake release routine used in the flowchart shown in FIG. 8, in connection with the apparatus.
Figure 10:
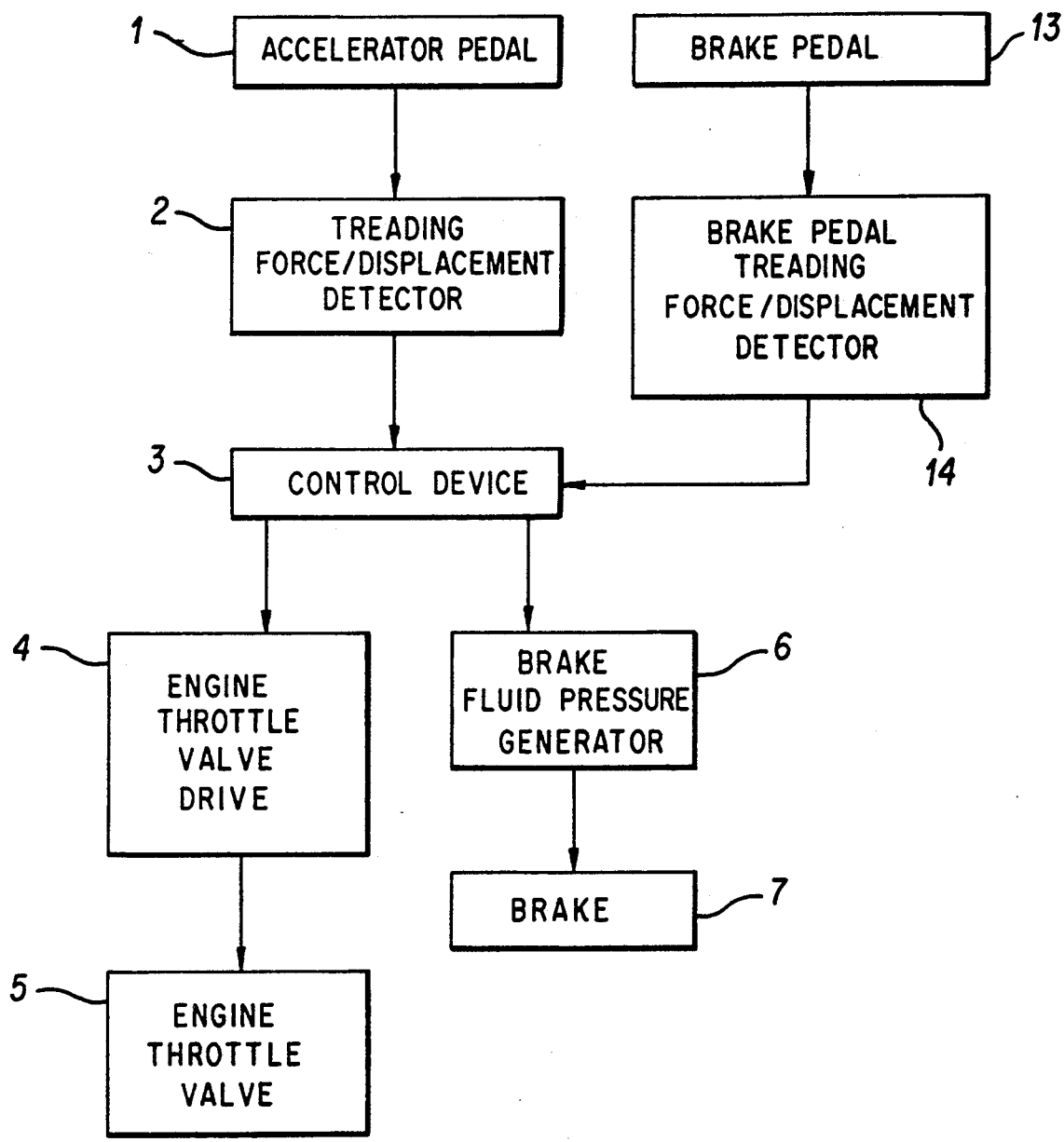
FIG. 10 is a block diagram of the apparatus in which the control device is operated according to the flowchart shown in FIG. 8 and the maximized-brake release routine is described according to the flowchart shown in FIG. 9.
Figure 11:
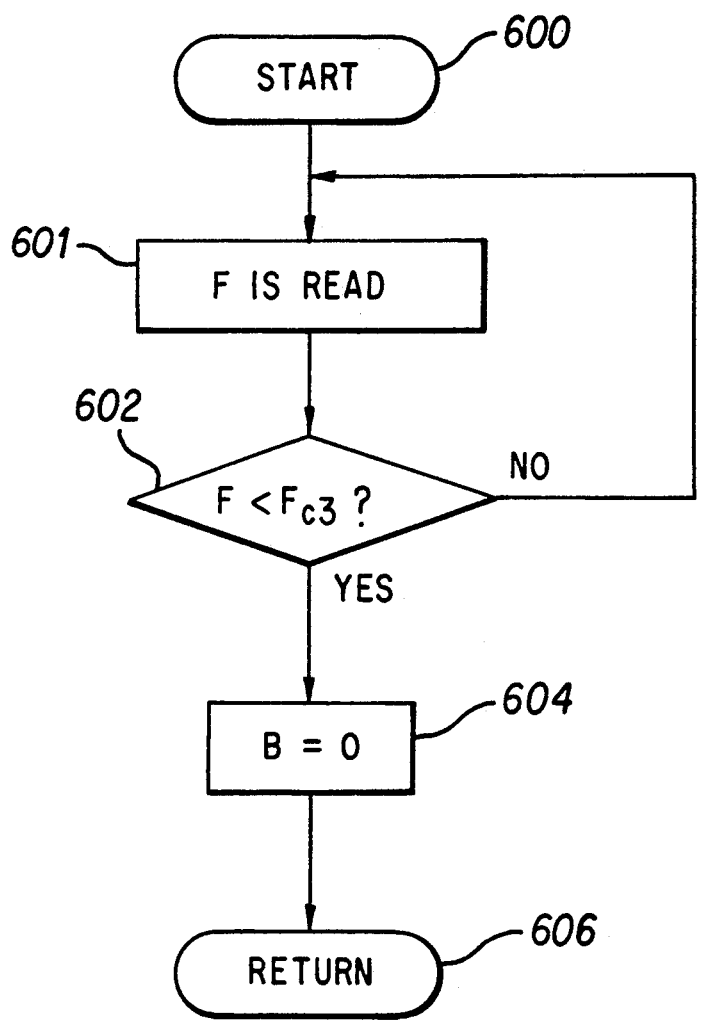
FIG. 11 is a flowchart of an example of the maximized-brake release routine used in the flowchart shown in FIG. 8.
Figure 12:
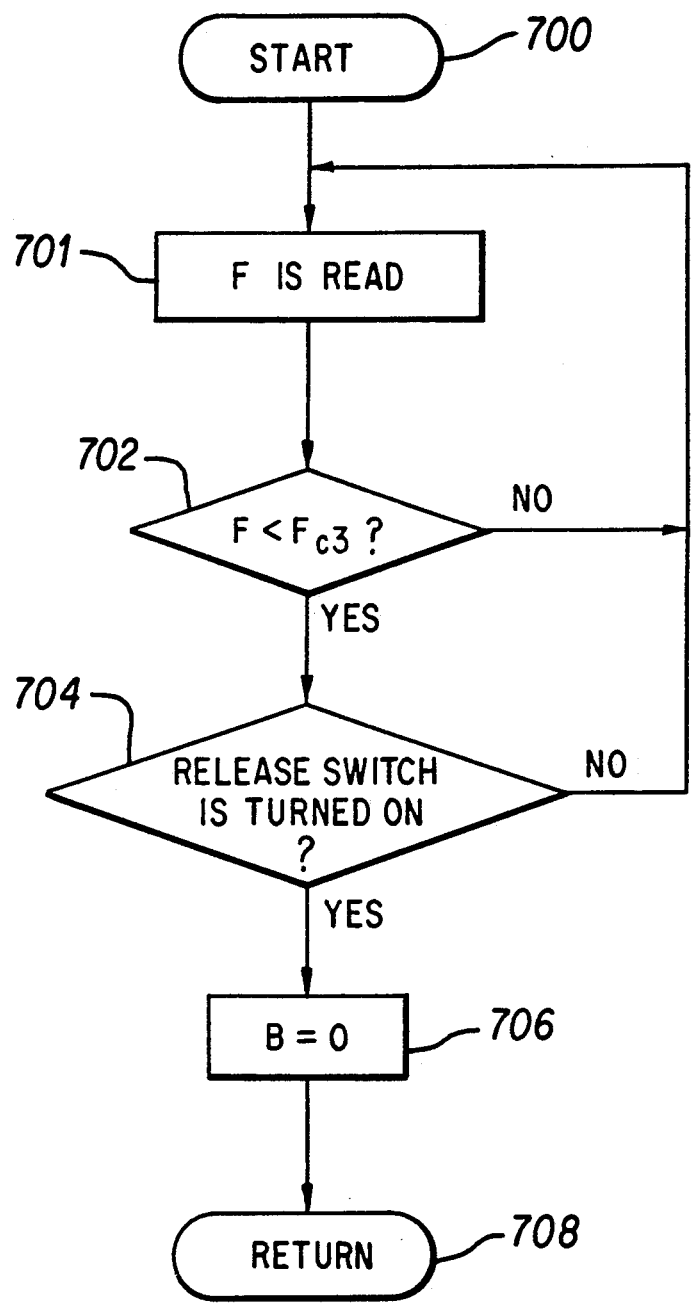
FIG. 12 is a flowchart of another example of the maximized-brake release routine used in the flowchart shown in FIG. 8, in connection with the apparatus.

An example of the maximized-brake release routine 422 is shown in FIG. 9, 11 or 12. The apparatus which has a maximized-brake release routine described in the flowchart in FIG. 9, is shown in the form of a block diagram in, for example, FIG. 10.

The apparatus is characterized in that a brake pedal treading force/displacement detector 14 is added to the arrangement of the apparatus shown in FIG. 1. According to this apparatus, the control device 3 is adapted to read not only an accelerator pedal treading force/displacement detected value, but also a brake pedal treading forced/displacement detected value, thereby to control the engine throttle valve, as well as the brakes.

An apparatus having a maximized-brake release routine described in the flowchart in FIG. 11, is shown in the form of a block diagram in, for example, FIG. 1 or 3.

Figure 14:
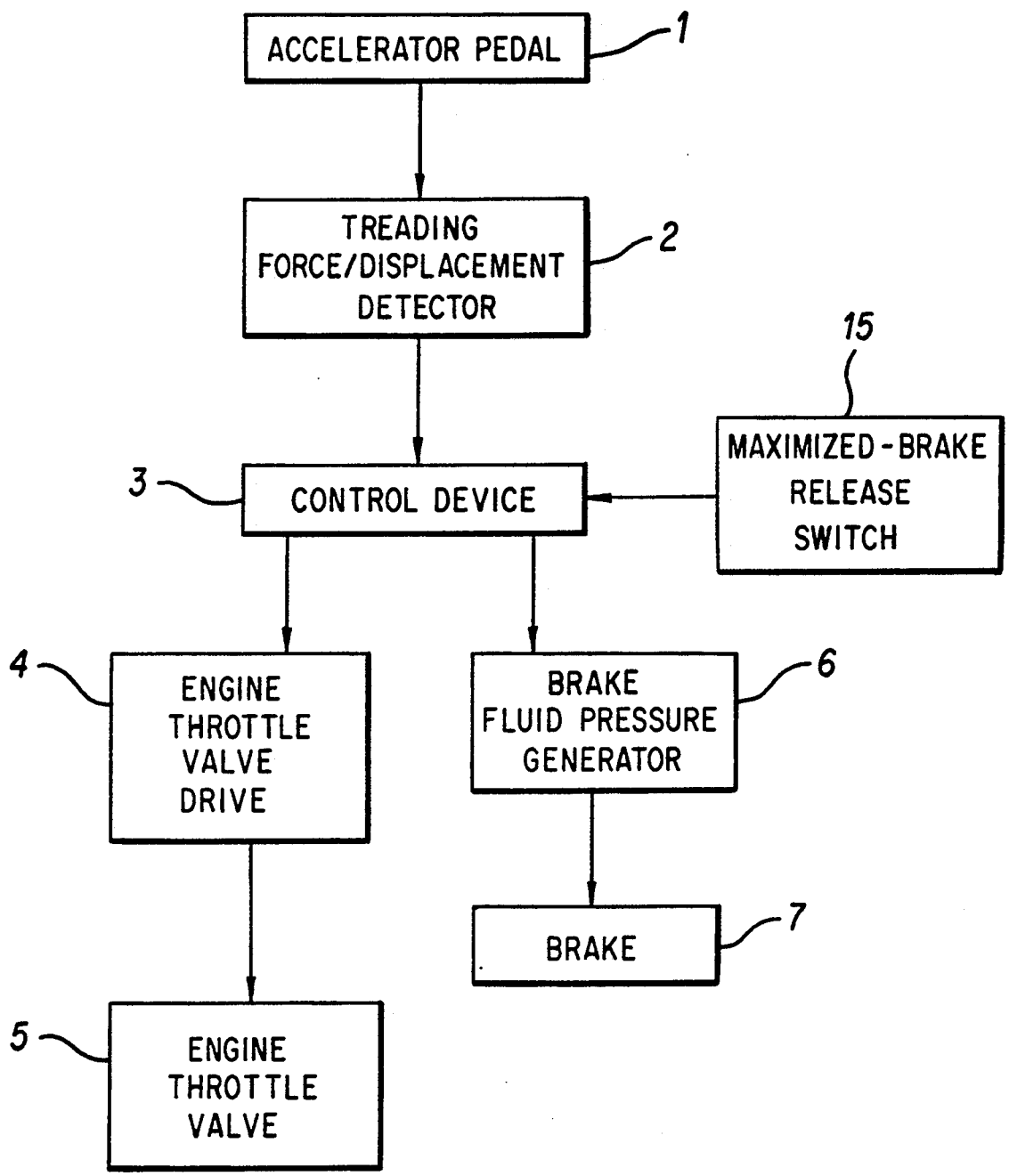
FIG. 14 is a block diagram of the apparatus in which the control device is operated according to the flowchart shown in FIG. 8 and the maximized-brake release routine is described according to the flowchart shown in FIG. 12.

An apparatus having a maximized-brake release routine described in the flowchart in FIG. 12, is shown in the form of a block diagram in, for example, FIG. 14. In FIG. 14, a switch operable by the driver is added to the arrangement shown by the block diagram in FIG. 1. The control device 3 is adapted to detect the operational state of the switch by an electric signal.

In the embodiment shown in FIG. 9, when the routine starts (500), the detected value F is read at a step 501. At a step 502, the detected value F is compared with the preset value $F_{c3}$. When the detected value F is equal to or greater than $F_{c3}$, the sequence is returned to the step 501. When F is smaller than $F_{c3}$, the sequence proceeds to a step 503, where a brake pedal treading force/displacement detected value D is read. At a step 504, the detected value D is compared with a predetermined set value $D_c$ which is greater than zero but near zero. When the detected value D is equal to or smaller than $D_c$, the sequence is returned to the step 501. When D is greater than $D_c$, the sequence proceeds to a step 506, where a brake fluid pressure indicating value B is set to zero. The sequence proceeds to a step 508, where this routine is finished. Then, the sequence is returned to the step 402 in FIG. 8. That is, the accelerator pedal is released and the brake pedal is trodden to a certain extent, thereby to release the state where the maximized brakes are applied.

In the embodiment shown in FIG. 11, the maximized-brake release routine starts at a step 600, and a detected value F is read at a step 601. At a step 602, the detected value F is compared with the preset value $F_{c3}$. When the detected value F is equal to or greater than $F_{c3}$, the sequence is returned to the step 601. When F is smaller than $F_{c3}$, the sequence proceeds to a step 604, where the indicating value B is set to zero. At a step 606, this routine is finished, and the sequence is returned to the step 402 in FIG. 8. That is, when the accelerator pedal is released, there is released the state where the maximized brakes are applied.

Figure 8:
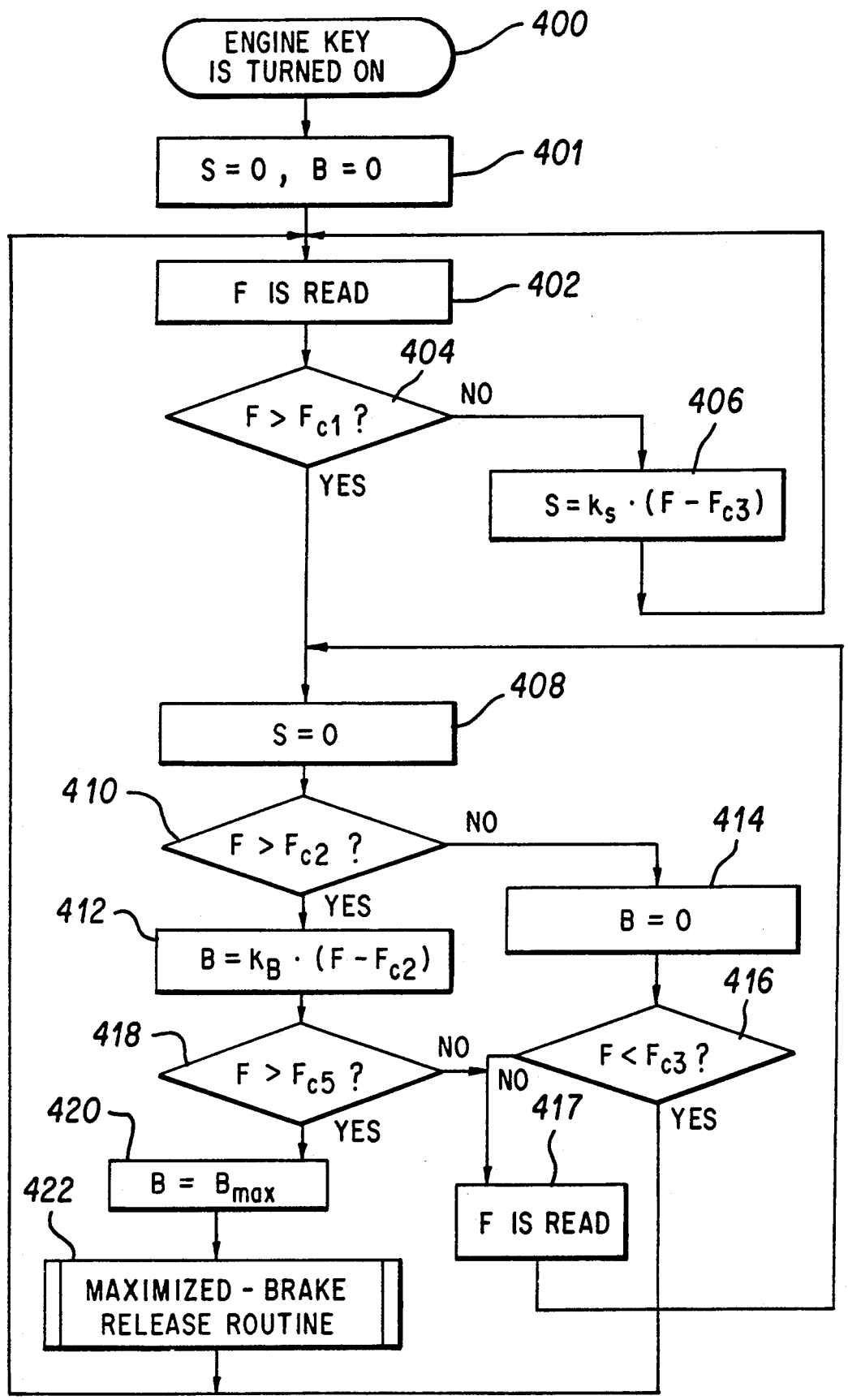
FIG. 8 is a flowchart illustrating the operations of a control device in an embodiment of apparatus.
Figure 13:
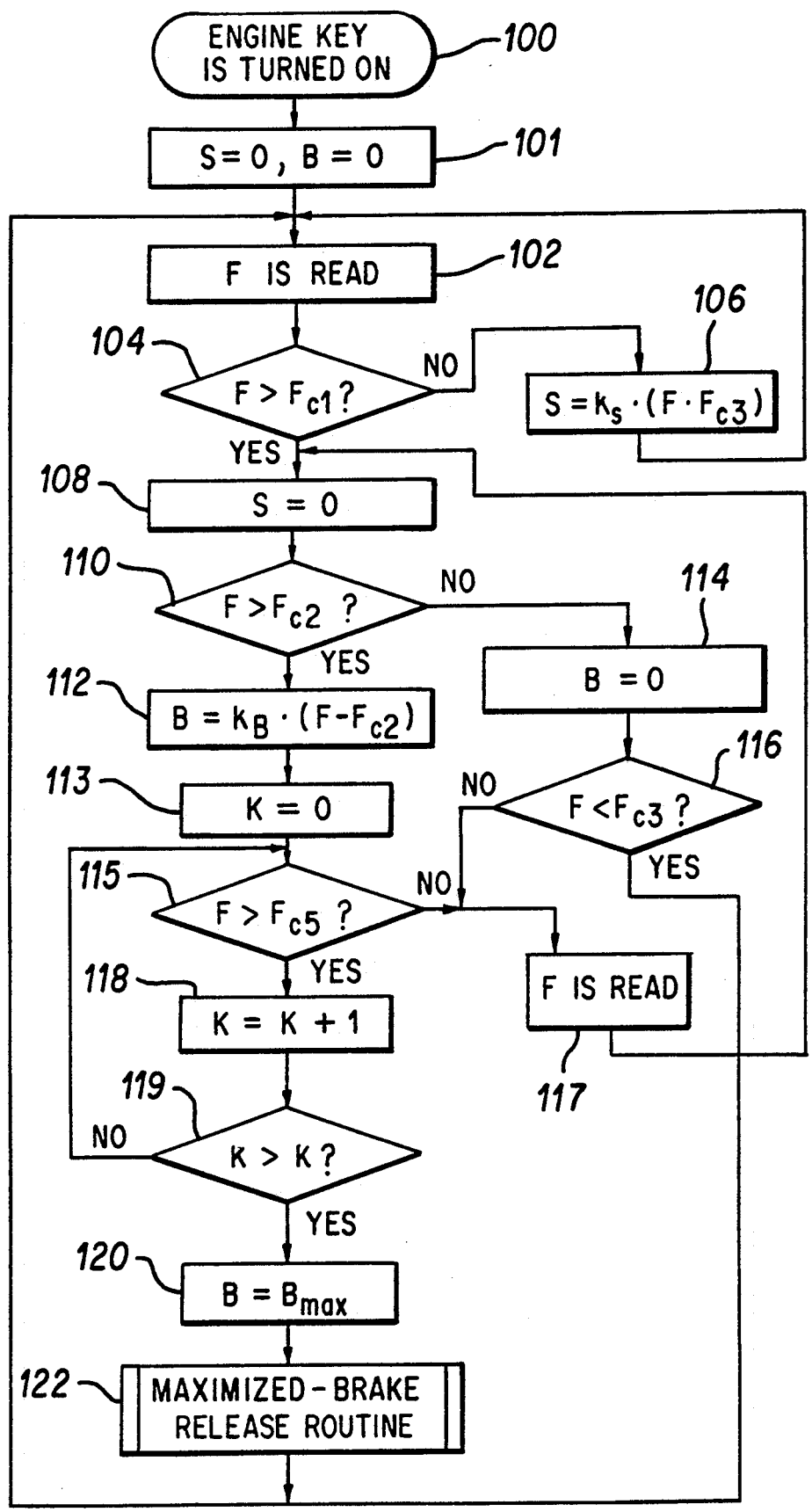
FIG. 13 is a flowchart of the operations of a control device in an embodiment of apparatus.

In the embodiment shown in FIG. 12, the maximized-brake release routine starts at a step 700, and a detected value F is read at a step 701. At a step 702, the detected value F is compared with the preset value $F_{c3}$. When the detected value F is equal to or greater than $F_{c3}$, the sequence is returned to the step 701. When F is smaller than $F_{c3}$, the sequence proceeds to a step 704, where the release switch is checked for operational state. When the release switch has not been turned ON, the sequence is returned to the step 701. On the contrary, when the release switch has been turned ON, the sequence proceeds to a step 706, where the brake fluid pressure indicating value B is set to zero. The sequence proceeds to a step 708, where this routine is finished. Then, the sequence is returned to the step 402 in FIG. 8. That is, when the accelerator pedal is released and the specified release switch is operated, there is released the state where the maximized brakes are applied. The operations of a control device 3 in another embodiment are shown in the form of a flowchart in FIG. 13. The flowchart in FIG. 13 is the same as that in FIG. 8, except that the step 418 in FIG. 8 is replaced with steps 113, 115, 118 and 119 in FIG. 13.

Through the step 112, the sequence proceeds to the step 113, where a variable k is initialized to zero. At the step 115, a treading force/displacement detected value F is compared in size with the preset value $F_{c5}$. When the detected value F is equal to or smaller than $F_{c5}$, the sequence proceeds to a step 117. When the detected value F is greater than $F_{c5}$, the sequence proceeds to the step 118, where the varialble k is incremented by +1. The sequence then proceeds to the step 119, where the variable k is compared in size with a predetermined preset positive value K. When the varialbe k is equal to or smaller than the constant K, the sequence is returned to the step 115. When k is greater than K, the sequence proceeds to a step 120.

According to this routine, there is provided a state where the maximized brakes are continuously applied when the treading force/displacement detected value F is greater than the predetermiend preset value $F_{c5}$, continuously for a period of time of about $\tau_1 \times K$. Here, $\tau_1$ is the time during which the sequence makes a round of a loop starting from and returning to the step 115 through the steps 118, 119.

An example of the maximized-brake release routine 122 is shown in FIG. 9, 11 or 12. The apparatus having a maximized-brake release routine described in the flowchart in FIG. 9, is shown in the form of a block diagram in, for example, FIG. 10. The apparatus having a maximized-brake release routine described in the flowchart in FIG. 11, is shown in the form of a block diagram in, for example, FIG. 1 or 3. The apparatus having a maximized-brake release routine described in the flowchart in FIG. 12, is shown in the form of a block diagram in, for example, FIG. 14.

Figure 15:
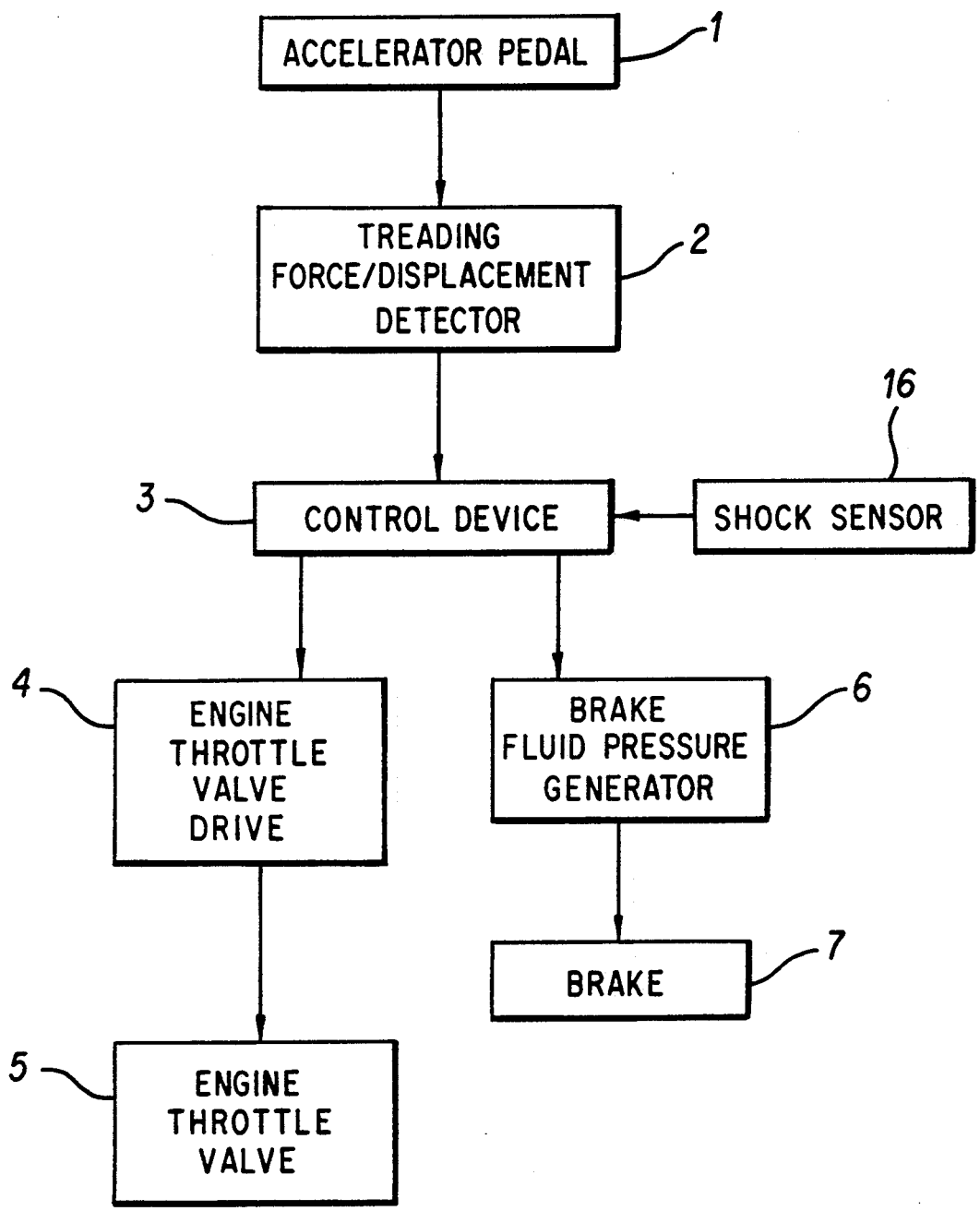
FIG. 15 is a block diagram of an embodiment of apparatus.

An embodiment in the form of a block diagram including a shock sensor added to the arrangement shown in FIG. 1, 3, 10 or 14, is shown in FIG. 15, in which a shock sensor 16 is added to the block diagram in FIG. 1.

Figure 16:
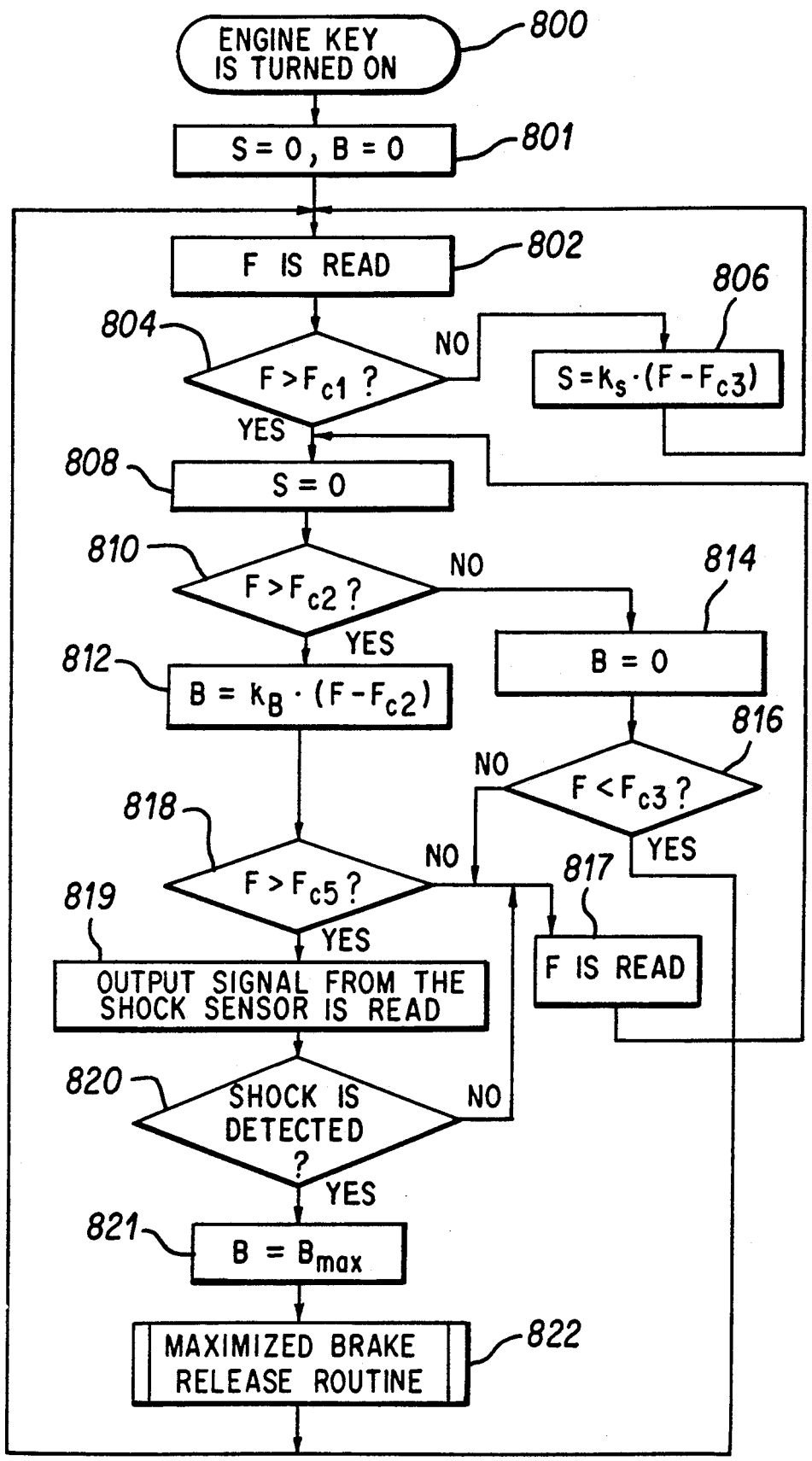
FIG. 16 is a flowchart illustrating the operations of a control device in an embodiment of the apparatus.

If the motor vehicle comes in collision with an obstacle or the like and a considerable shock is exerted to the vehicle body, the shock sensor detects such a shock and supplies a detection signal to the control device 3. Based on output signals from the treading force/displacement detector 2 and the shock sensor 16, the control device 3 controls the engine throttle valve opening degree and the brake fluid pressure. FIG. 16 shows a flowchart of the operations of the control device 3 in this embodiment.

At a step 818, an accelerator pedal treading force/displacement detected value F is compared in size with the predetermined preset value $F_{c5}$ of accelerator pedal treading force/displacement set forth in the embodiment of apparatus of claim 4, 5 or 6. When the detected value F is equal to or smaller than the preset value $F_{c5}$, the sequence proceeds to a step 817. When the detected value F is greater than the preset value $F_{c5}$, the sequence proceeds to a step 819. At the step 819, an output signal from the shock sensor 16 is read. At a step 820, the contents of the output signal thus read are checked. When this output signal represents that the shock sensor has detected no shock, the sequence proceeds to a step 817. On the contrary, when this output signal represents that the shock sensor has detected a shock, the sequence proceeds to a step 821. Except the addition of the steps 819 and 820, all the processings are the same as those in the flowchart in FIG. 8. The maximized-brake release routine shown at a step 822 is shown, in more detailed form in FIG. 9, 11 or 12.

Figure 17:
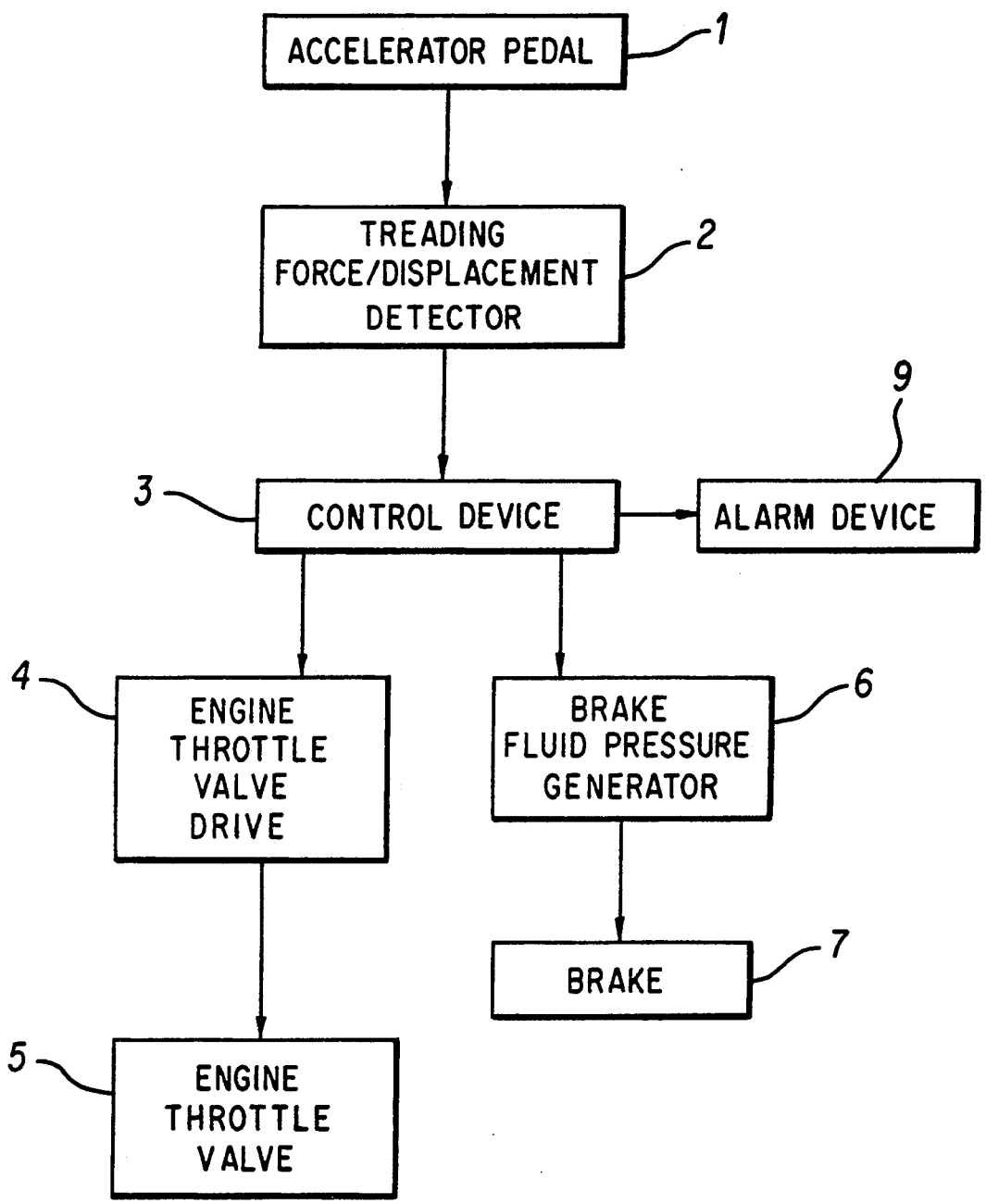
FIG. 17 is a block diagram of an embodiment of apparatus.

An embodiment of an apparatus of claim 9 is shown in the form of a block diagram in FIG. 17 is arranged such that an alarm device 9 is driven when a control device 3 indicates a maximized-brake state. The alarm device 9 includes (a) a buzzer, (b) flash lamps, (c) lightings or (d) tail lamps and indicators. The buzzer is so arranged as to sound inside or outside of the motor vehicle. The flash lamps and lightings are so arranged as to flicker, and the tail lamps and indicators are so arranged as to simultaneously flicker.

An example of the operations of the control device 3 is arranged such that the control device 3 indicates an actuation of the alarm device at the same time when the indicating value B is set to the maximized value $B_{max}$, for example, at the step 420 in FIG. 8, and that the control device 3 indicates a release of the actuation of the alarm device at the same time when the maximized-brake release routine is finished at the step 422. By the actuation of the alarm device, the fact that the motor vehicle is under emergent stop may be informed inside and outside of the motor vehicle. This enhances the safety.

Figure 18:
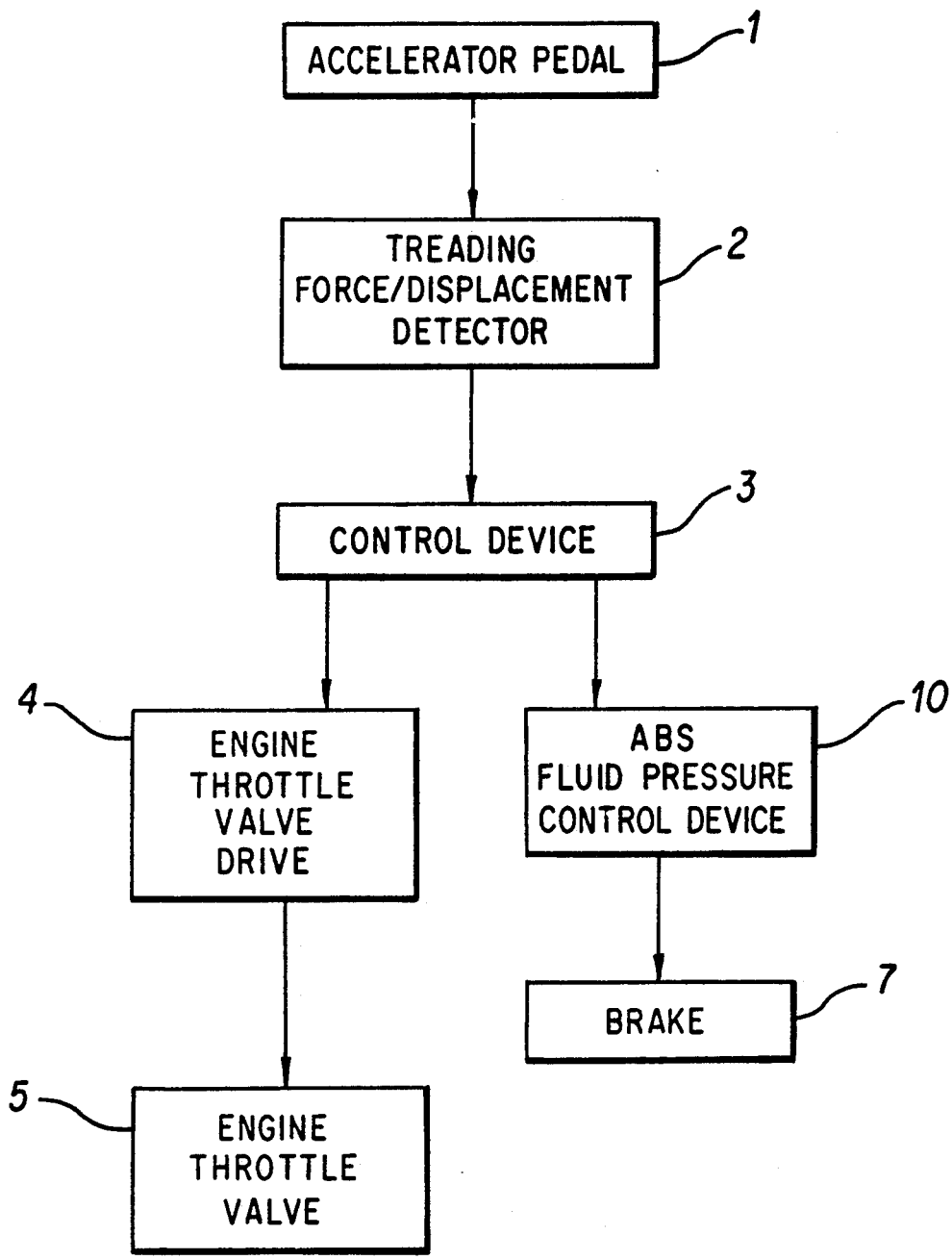
FIG. 18 is a block diagram of an embodiment of apparatus.

In an embodiment of an apparatus shown in the form of a block diagram in FIG. 18 an anti-lock brake (ABS) fluid pressure control device 10 is incorporated, instead of the brake fluid pressure generator 6, as in the block diagram of the embodiment of FIG. 1.

According to this embodiment in FIG. 18, the brakes are applied through an ABS fluid pressure control device 10 according to an indicating value of a control device 3. Within a range of the indicating value abovementioned, the brakes are so controlled as to prevent the wheels from being fixed (locked). It is noted that the ABS fluid pressure control device is known per se. In particular, in the apparatus when the accelerator pedal is trodden so strongly or deeply that the brakes are applied with a maximized fluid pressure, and such application is continued until the motor vehicle is stopped, the brakes may be applied with a maximum friction with respect to the road surface, while assuring the steering ability. This is a particularly important function in view of improvement in safety.

Figure 19:
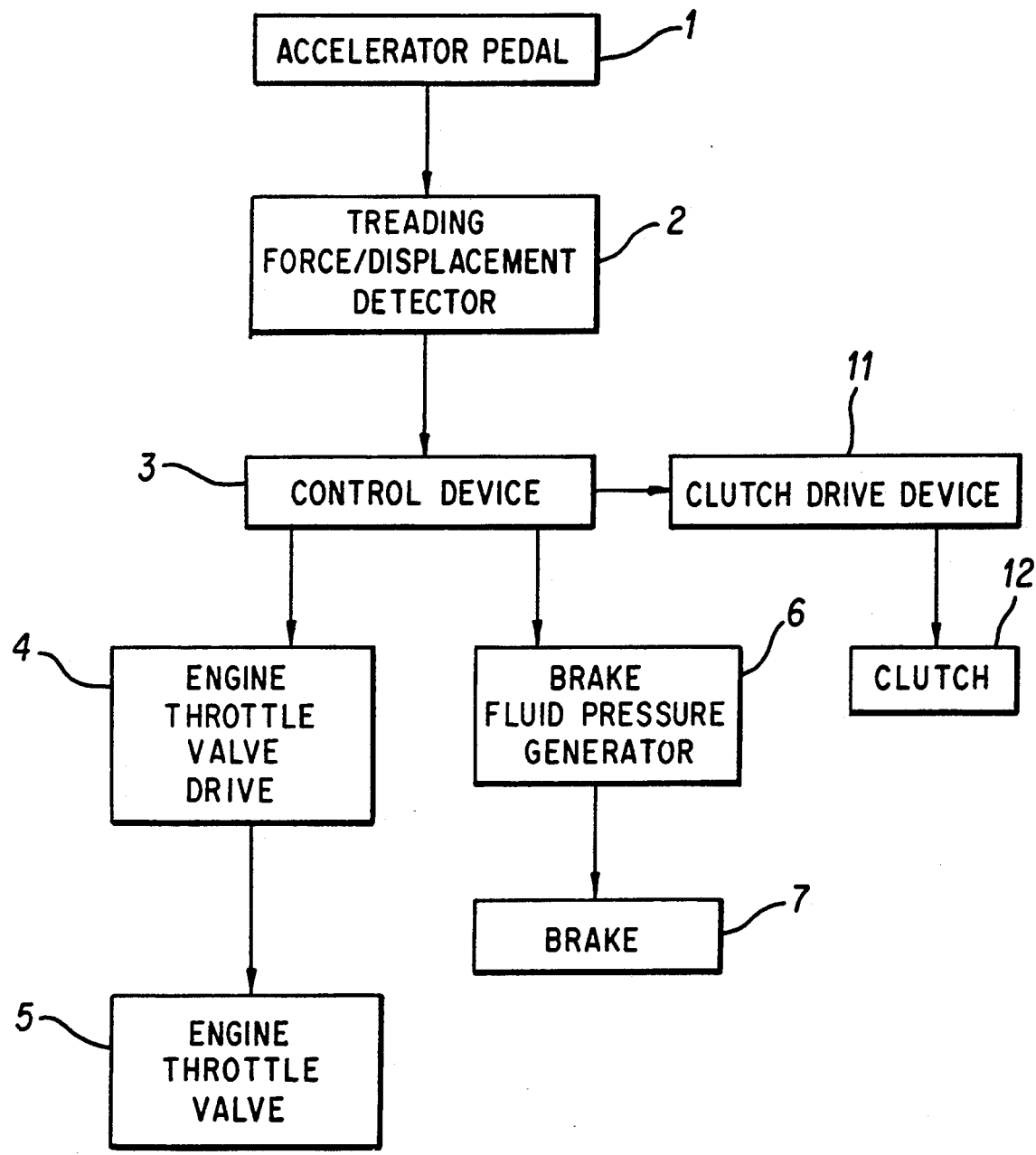
FIG. 19 is a block diagram of an embodiment of apparatus.

An embodiment of an apparatus is shown in the form of a block diagram in FIG. 19, in which a clutch drive device 11 is added to the block diagram of the apparatus of FIG. 1. According to this embodiment, a control device 3 not only controls the engine throttle valve and the brakes, but also a clutch 12.

An example of the operations of the control device 3 is arranged such that the control device 3 instructs the clutch drive device to separate the clutch at the same time when the engine throttle valve opening degree indicating value S is set to zero, for example, at the step 908 in the flowchart in FIG. 2. Further, when a judgement YES is obtained at the step 916, the control device 3 instructs the clutch drive device to connect the clutch at the step just before the sequence is returned to the step 902.

The apparatus is so arranged as not to prevent a normal braking operation by the brake pedal. More specifically, the brake fluid pressure unit is composed of two sysems, i.e., a first sysem for generating a fluid pressure by the brake pedal and the master cylinder, and a second system for generating a fluid pressure by the apparatus. Both systems may apply the brakes. Such arrangement of the fluid pressure systems is readily made according to prior arts. Accordingly, the brake pedal may serve as a normal brake pedal even though the brake fluid pressure indicating value B is set to, for example, zero by the control device 3.

The apparatus is so arranged as not to prevent a clutch disconnection operation by the clutch pedal. More specifically, the clutch drive unit includes two systems, i.e., a first drive system by the apparatus and a second drive system by the clutch pedal. Any of both systems may disconnect the clutch. Such arrangement of the clutch drive unit may be readily made according to prior arts. Accordingly, when the control device 3 of the apparatus instructs the disconnection of the clutch, the clutch pedal may serve as a normal clutch pedal.

What is claimed is:

1. A motor vehicle braking apparatus for a vehicle having brakes operated by pressure of a brake fluid, an engine throttle valve and an accelerator pedal comprising: a treading force/displacement detector for detecting a treading force/displacement of the accelerator pedal of the vehicle; and a control device for controlling the engine throttle valve opening degree and the brakes, said control device being arranged such that:
(i) the accelerator pedal serves as a normal accelerator pedal for increasing the opening area of the engine throttle valve with increase in accelerator pedal treading force/displacement detected value;

(ii) the engine throttle valve is closed when the detector detects a treading force/displacement exceeding a first predetermined treading force/displacement value;

(iii) when the detector detects a treading force/displacement value greater than a second predetermined treading force/displacement value which is greater than said first predetermined treading force/displacement value, the brake fluid pressure is increased or decreased according to the size of the detected treading force/displacement value;

(iv) the brake fluid pressure is released when the treading force/displacement is smaller than said second predetermined treading force/displacement value;

(v) the accelerator pedal is restored to serve as a normal accelerator pedal when the treading force/displacement is smaller than a third predetermined treading force/displacement value near zero, after the throttle valve has been closed in response to the detection of said first value; and (vi) the engine throttle valve is held closed until the accelerator pedal is so restored to serve as a normal accelerator pedal, following said closing of the throttle valve.

2. A motor vehicle braking apparatus as set forth in claim 1, further comprising accelerator pedal reaction force generating means arranged to provide treading force vs. displacement characteristics in which the treading force is suddenly increased as compared with increase in treading displacement, at a fourth predetermined treading force/displacement value which is lower than the first predetermined treading force/displacement value and higher than the third predetermined treading force/displacement value.

3. A motor vehicle braking apparatus as set forth in claim 1 wherein the control device is arranged such that, when the opening area of the engine throttle valve is increased with increase in accelerator pedal treading force/displacement before the treading force/displacement becomes greater than the first predetermined treading force/displacement value, there is a predetermined time delay between the increase in treading force/displacement and the subsequent response of the engine throttle valve.

4. A motor vehicle braking apparatus as set forth in claim 1, further comprising a brake pedal treading force/displacement detector, and wherein the control device is arranged such that:

(i) there is a fifth predetermined accelerator pedal treading force/displacement value higher than the second predetermined treading force/displacement value;

(ii) the brake fluid pressure is maximized when the accelerator pedal treading force/displacement becomes greater than said fifth preset value; and (iii) when the accelerator pedal treading force/displacement is smaller than the third predetermined treading force/displacement value and said brake pedal treading force/displacement detector device detects a predetermined brake pedal treading force/displacement value, the maximized brake fluid pressure is released so that the brake pedal and the accelerator pedal are so restored as to serve as a normal brake pedal and a normal accelerator pedal, respectively.

5. A motor vehicle braking apparatus as set forth in claim 1, wherein the control device is arranged such that:

(i) there is set a fifth predetermined accelerator pedal treading force/displacement value higher than the second predetermined treading force/displacement value;

(ii) the brake fluid pressure is maximized when the accelerator pedal treading force/displacement becomes greater than said fifth preset value; and (iii) when the accelerator pedal treading force/displacement is smaller than the third predetermined treading force/displacement value, the brake fluid pressure is released, causing the accelerator pedal to be so restored as to serve as a normal accelerator pedal 6. A motor vehicle braking apparatus as set forth in claim 1, further comprising a switch operable by the driver, and wherein the control device is arranged such that:

(i) there is set a fifth predetermined accelerator pedal treading force/displacement value greater than the second predetermined treading force/displacement value;

(ii) the brake fluid pressure is maximized when the accelerator pedal treading force/displacement becomes greater than said fifth preset value; and (iii) when the accelerator pedal treading force/displacement is smaller than the third predetermined treading force/displacement value and said switch is operated, the maximized brake fluid pressure is released, causing the accelerator pedal to be so restored as to serve as a normal accelerator pedal.

7. A motor vehicle braking apparatus as set forth in claim 4, 5 or 6, wherein the control device is arranged such that the brake fluid pressure is maximized when the accelerator pedal treading force/displacement is continuously greater than the fifth predetermined preset value for a predetermined period of time.

8. A motor vehicle braking apparatus as set forth in claim 4, further comprising a shock sensor for detecting a shock, if any, exerted to the motor vehicle, and wherein the control device is arranged such that, when said shock sensor supplies a detection signal at the time the accelerator pedal treading force/displacement is greater than the fifth predetermined preset value, the brake fluid pressure is maximized from the point of time that said detection signal is supplied.

9. A motor vehicle braking apparatus as set forth in claim 4, further comprising an alarm device, said alarm device being adapted to be actuated to give, at least either inside or outside of a motor vehicle, a sound or light alarm while there is continued the state of a maximized brake fluid pressure provoked by the fact that the accelerator pedal treading force/displacement has exceeded the fifth predetermined value.

10. A motor vehicle braking apparatus as set forth in claim 1, further comprising an anti-lock braking device arranged such that the brake fluid pressure is subjected to an anti-lock control when the brakes are applied.

11. A motor vehicle braking apparatus as set forth in claim 1, further comprising a clutch drive device adapted (i) to disconnect the clutch at the same time when the control device closes the engine throttle valve when the accelerator pedal treading/displacement detector detects that the accelerator pedal treading force/displacement is greater than the first predetermined treading force/displacement value, and (ii) to connect the clutch at the same time when the accelerator pedal is so restored as to serve as a normal accelerator pedal.

* * * * *